United States Patent [19]
Pounds et al.

[11] Patent Number: 5,561,580
[45] Date of Patent: Oct. 1, 1996

[54] CONTROLLER FOR A PART FEED SYSTEM INCLUDING A BLOWN FUSE INDICATOR CIRCUIT

[75] Inventors: David G. Pounds, Marion Center; Randy K. Baird, Bolivar, both of Pa.

[73] Assignee: FMC Corporation, Chicago, Ill.

[21] Appl. No.: 418,050

[22] Filed: Apr. 6, 1995

[51] Int. Cl.6 .................................................. H02H 5/04
[52] U.S. Cl. ................................. 361/104; 340/638
[58] Field of Search .................... 361/104; 324/537, 324/550; 340/635, 638; 198/444, 453, 459, 571–576

[56] References Cited

U.S. PATENT DOCUMENTS

| | | | |
|---|---|---|---|
| 4,554,490 | 11/1985 | Scott | 318/130 |
| 4,619,356 | 10/1986 | Dean et al. | 198/395 |
| 4,691,197 | 9/1987 | Damiano et al. | 361/104 |
| 5,229,909 | 7/1993 | Tessmer et al. | 361/104 |
| 5,378,931 | 1/1995 | Bolda et al. | 361/104 |

OTHER PUBLICATIONS

Syntron Parts Handling Equipment Copyright 1994—FMC Corporation No Month.

*Primary Examiner*—Jeffrey A. Gaffin
*Assistant Examiner*—Ronald W. Leja
*Attorney, Agent, or Firm*—Michael C. Penn

[57] ABSTRACT

There is provided a microcontroller for controlling the activation of a hopper, bowl feeder, and linear feeder. There is further provided a blown fuse circuit which indicates that a fuse has blown for the various components of the part feeder system as well as preventing machines at the load from being powered should the fuse blow.

4 Claims, 13 Drawing Sheets

FIG_1
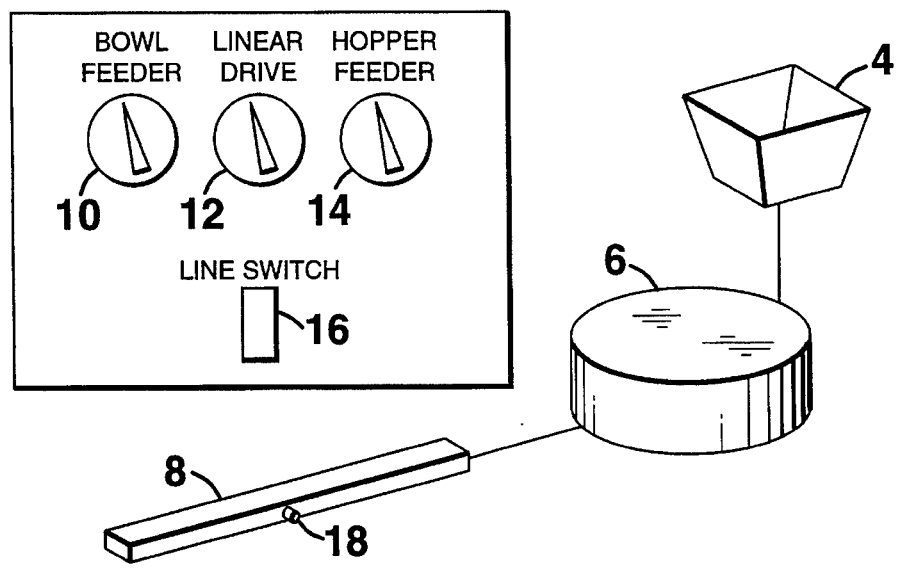
FIG_2
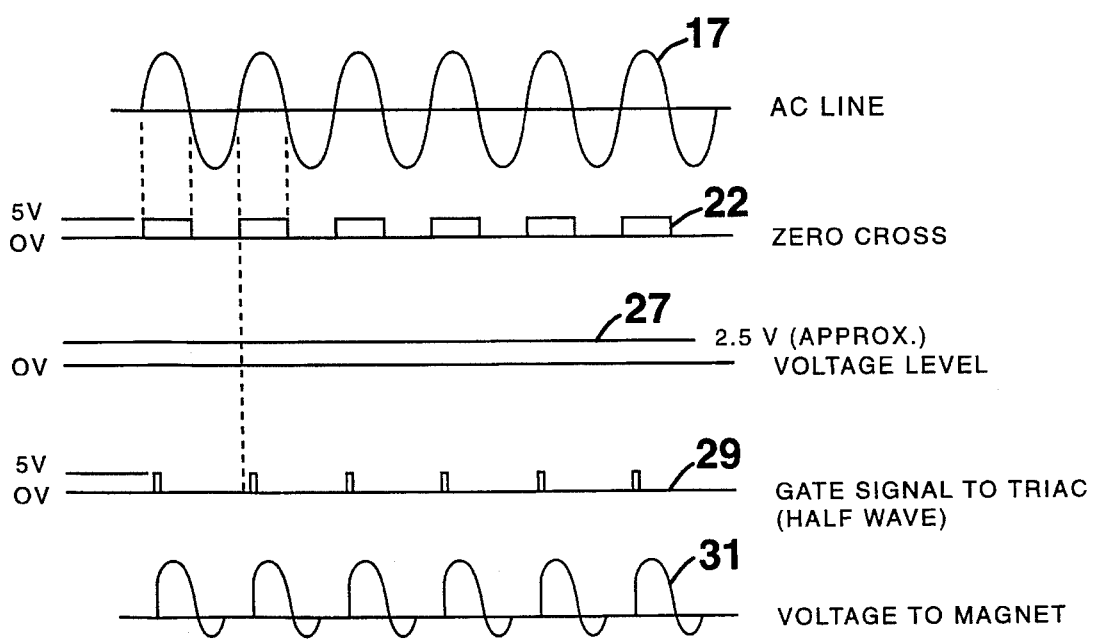

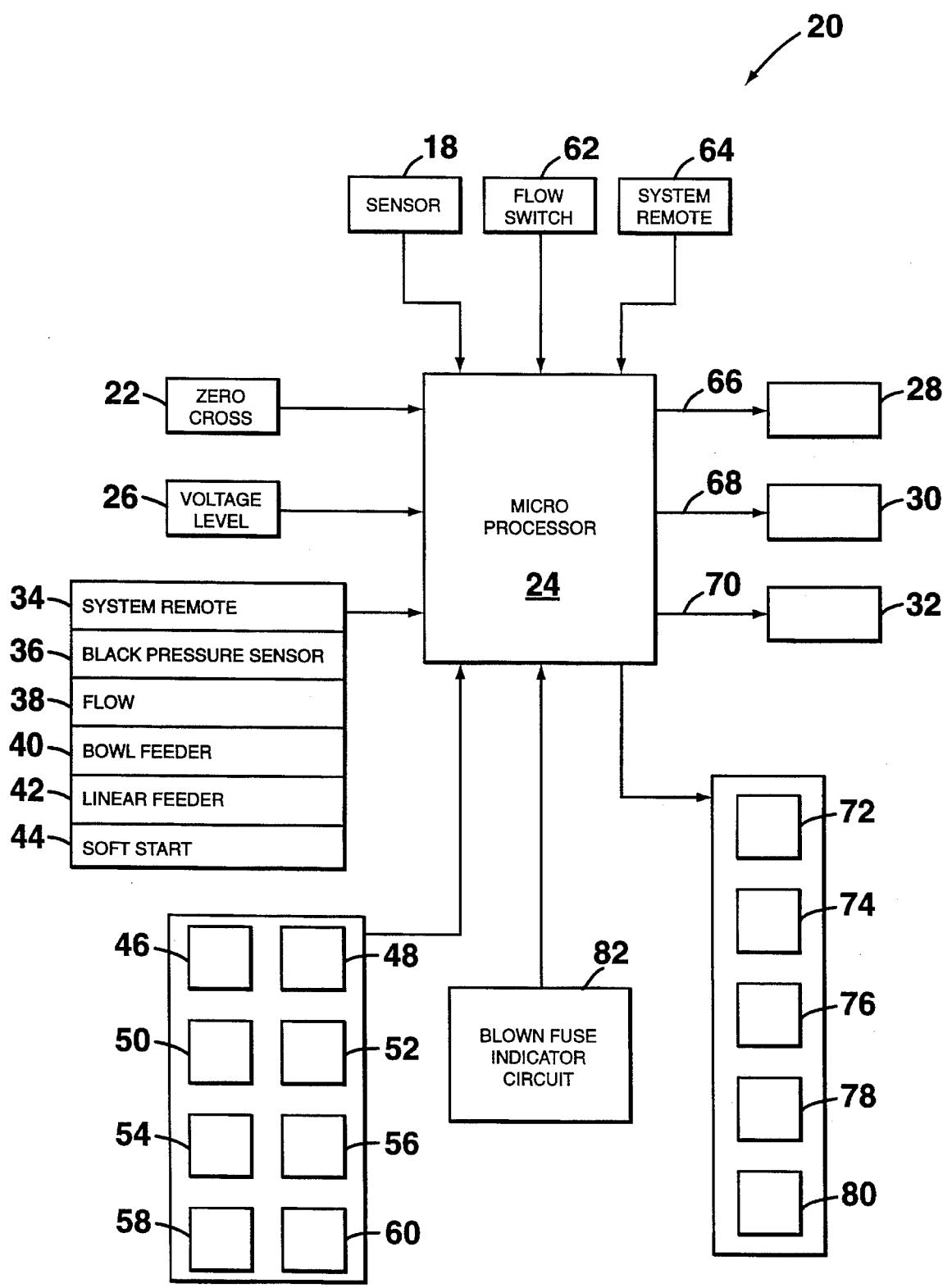
FIG_3

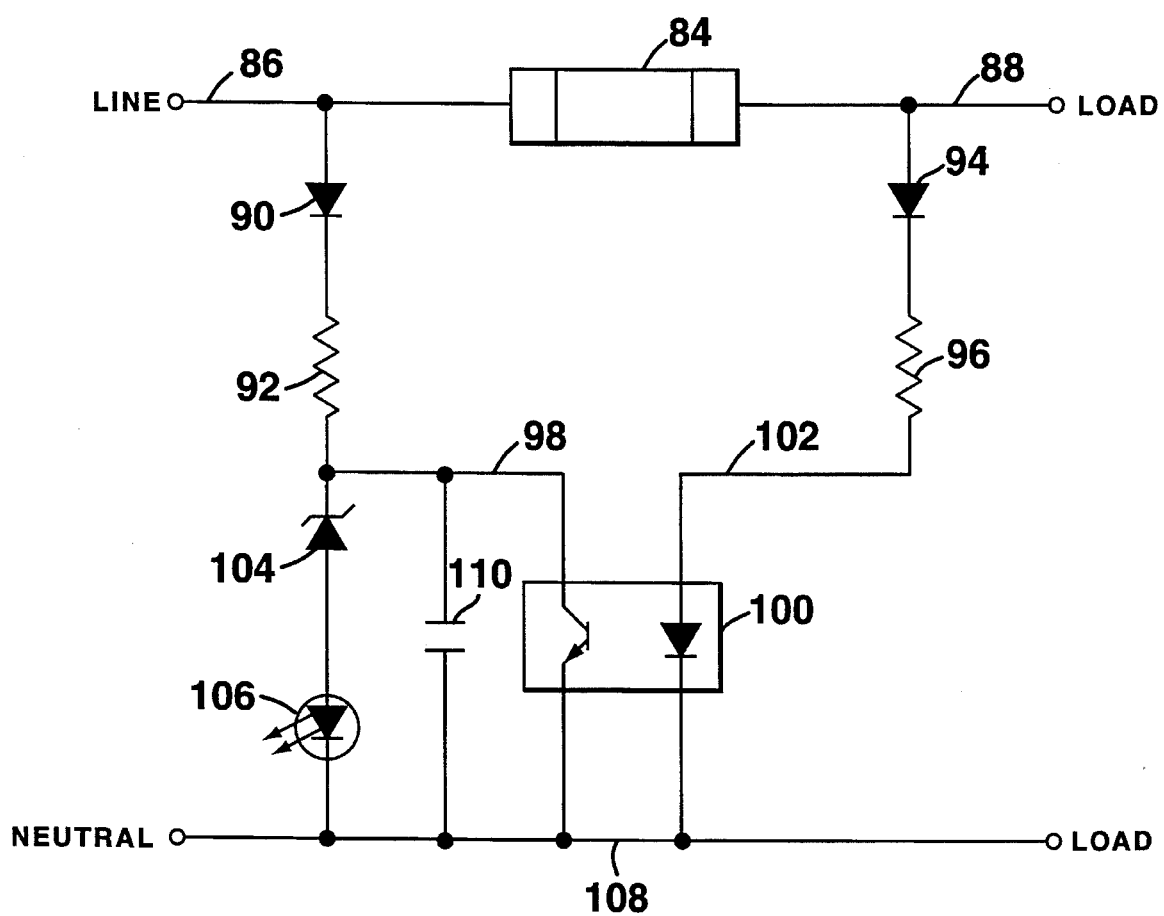

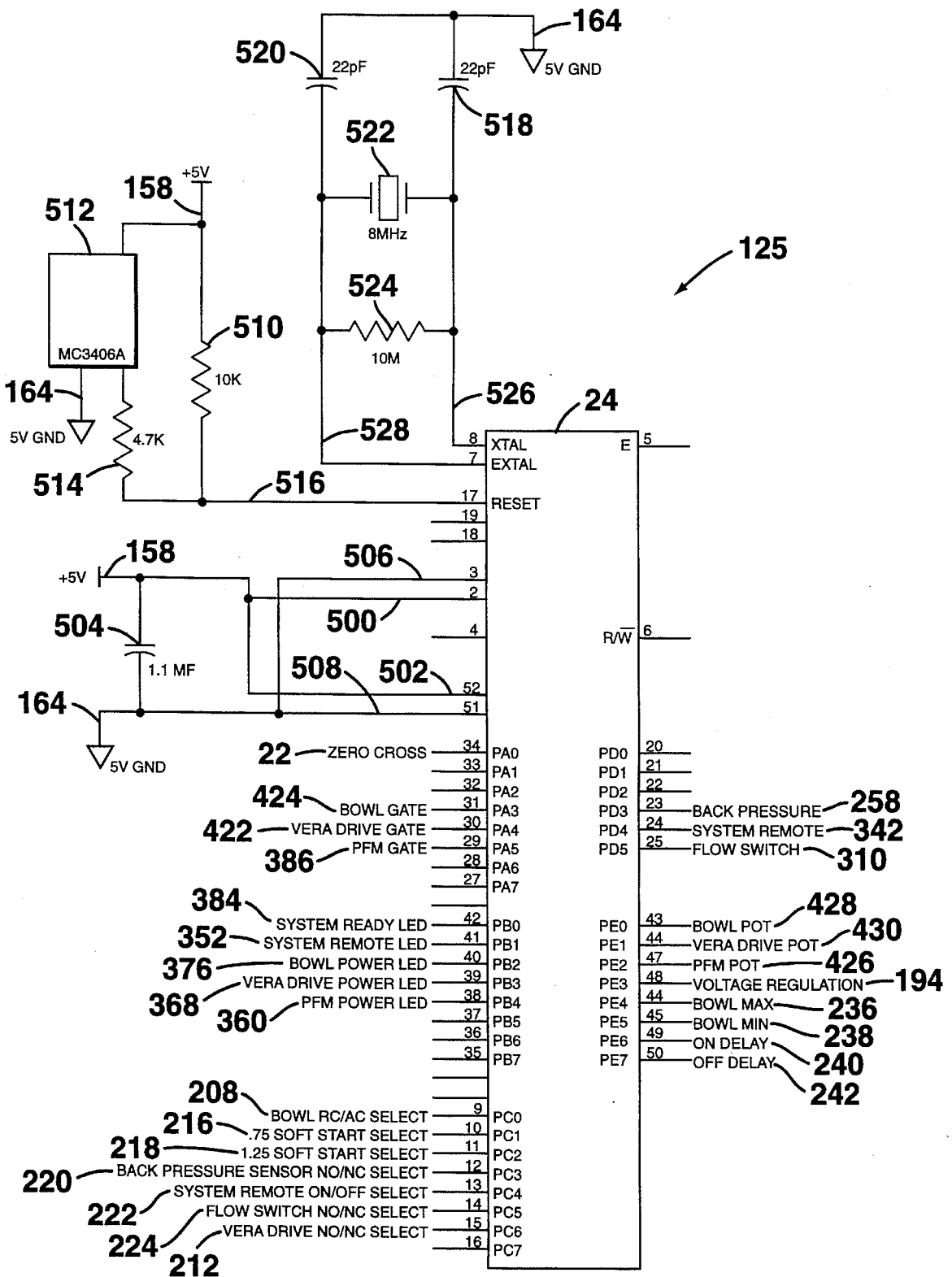

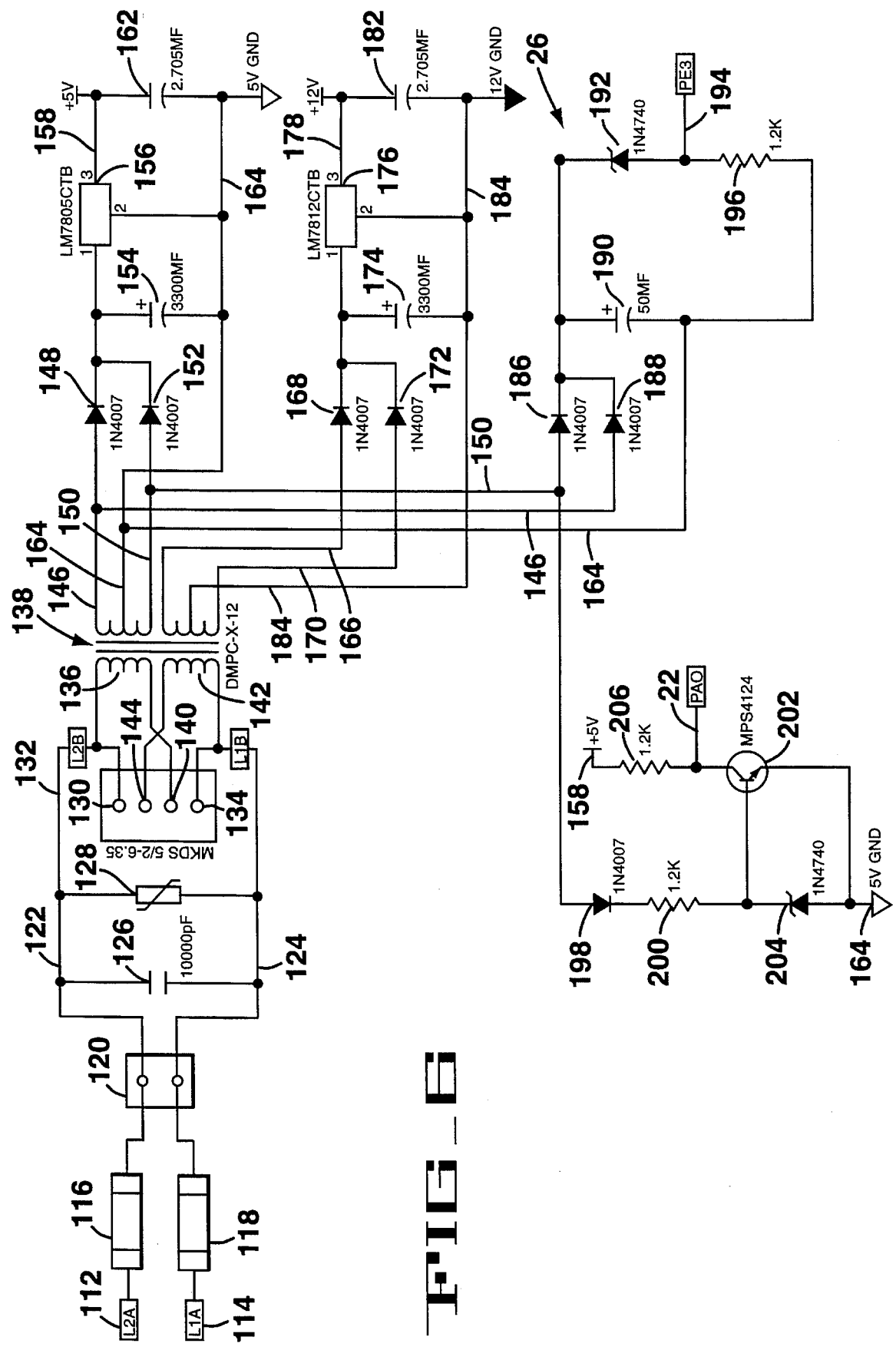
FIG_6

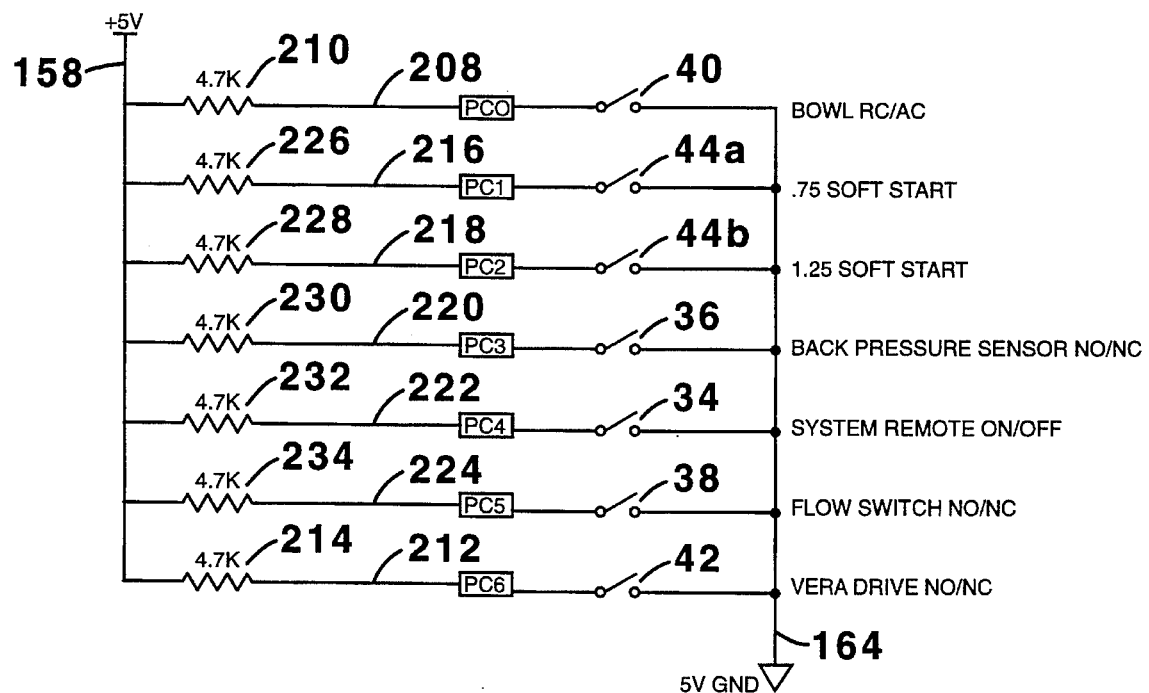
FIG_7
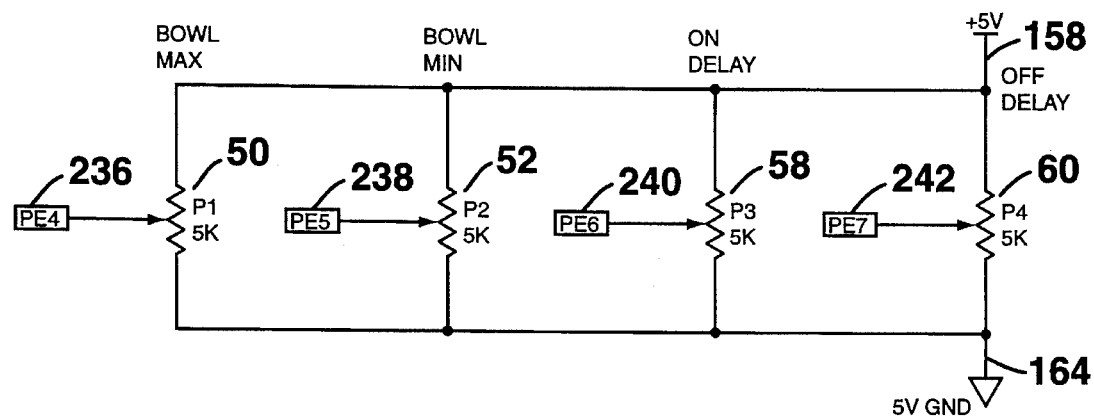
FIG_8

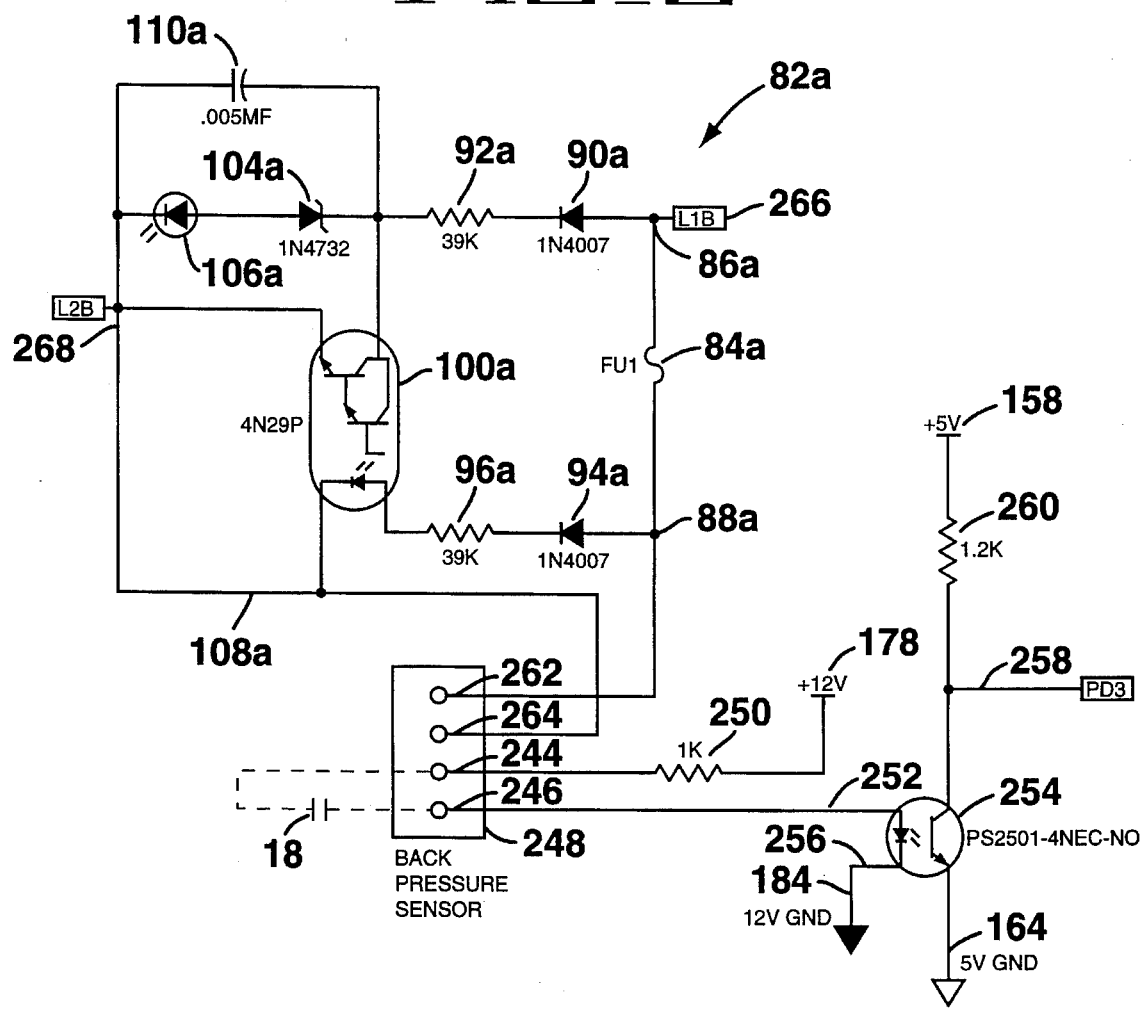
FIG_9
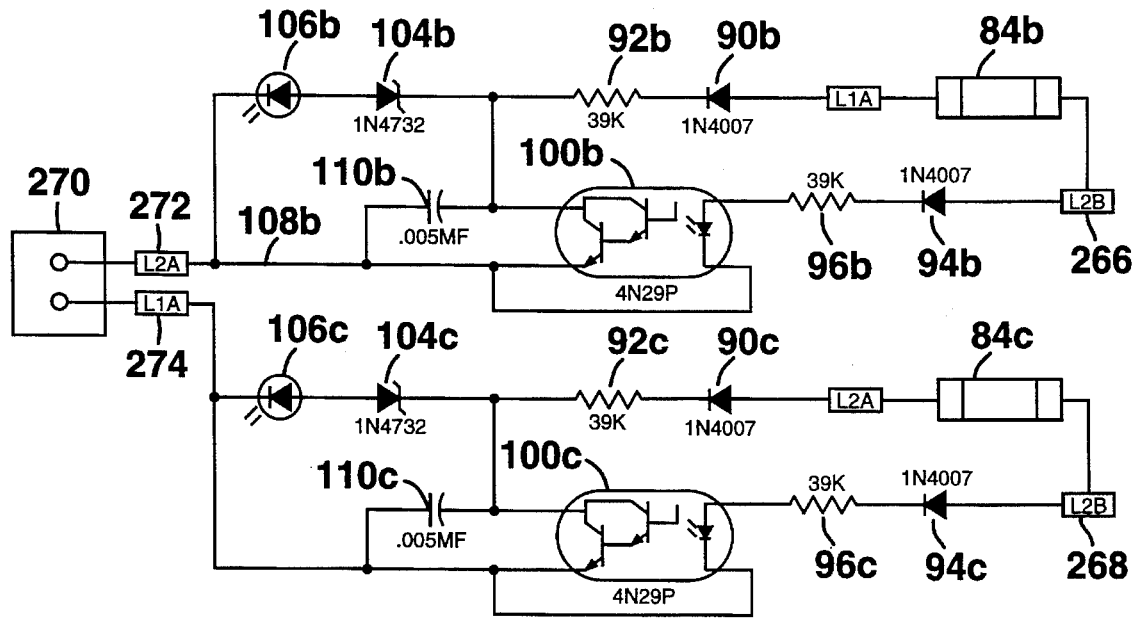
FIG_10

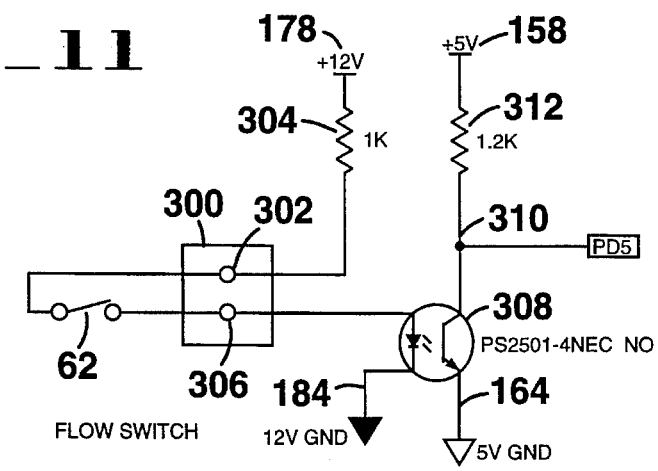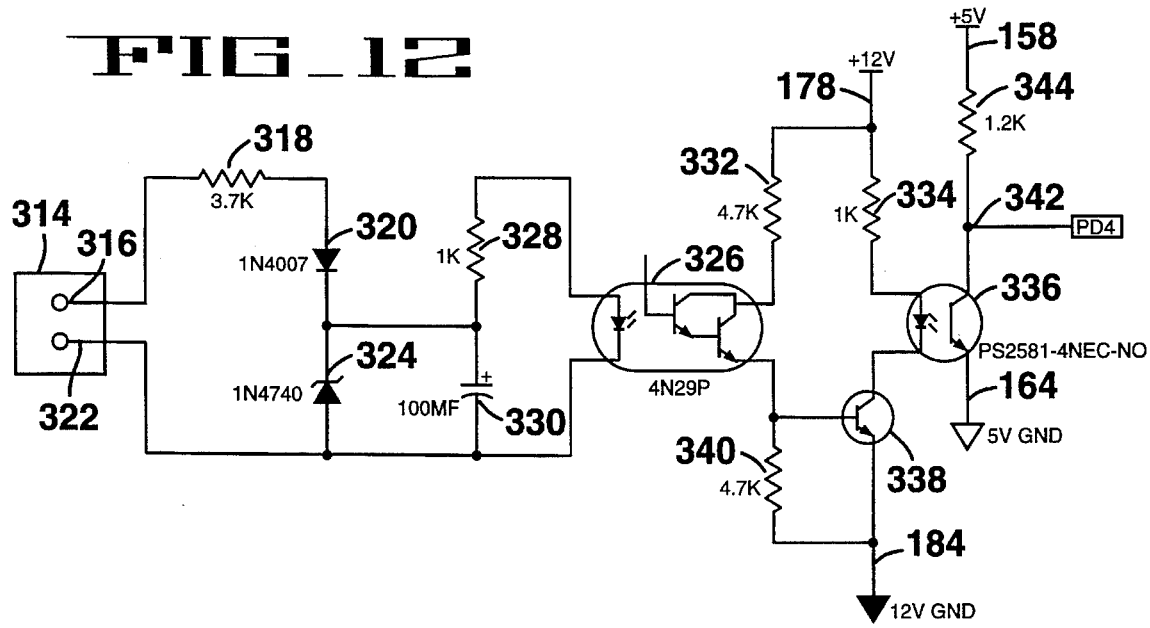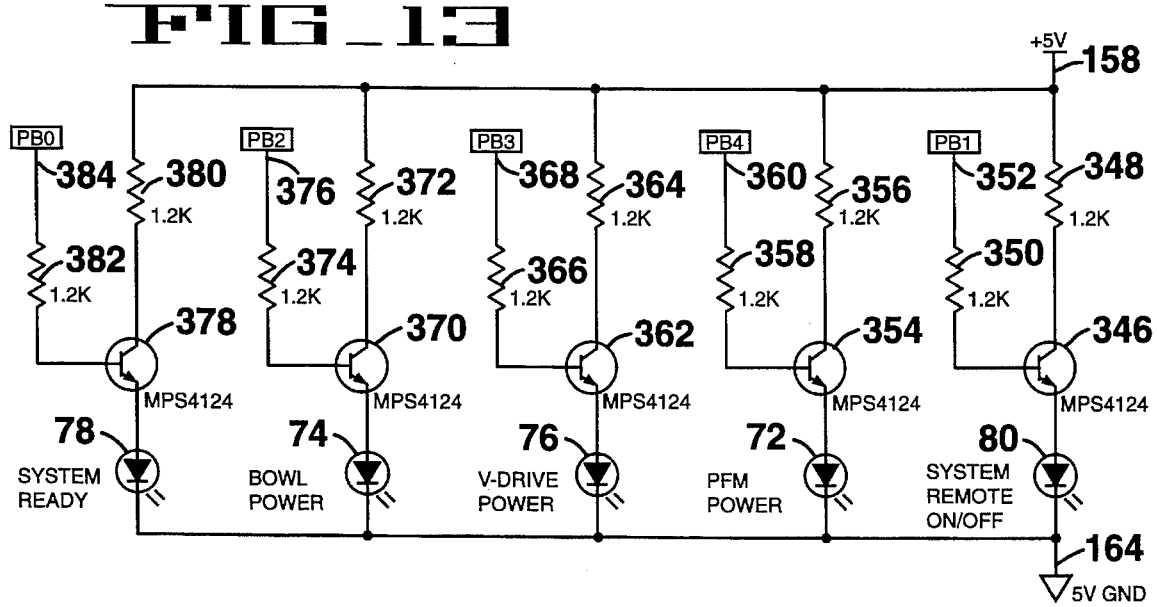

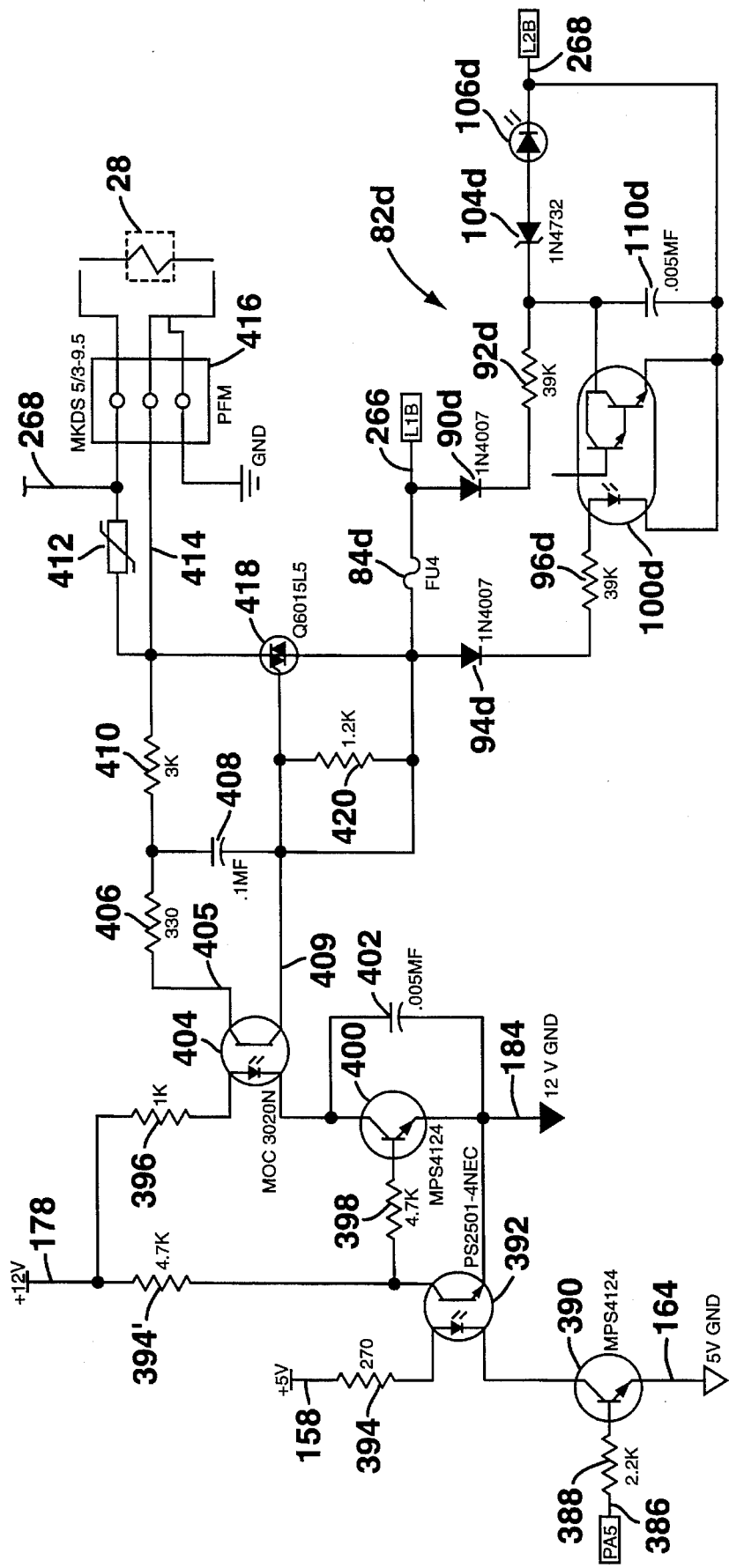
FIG_14

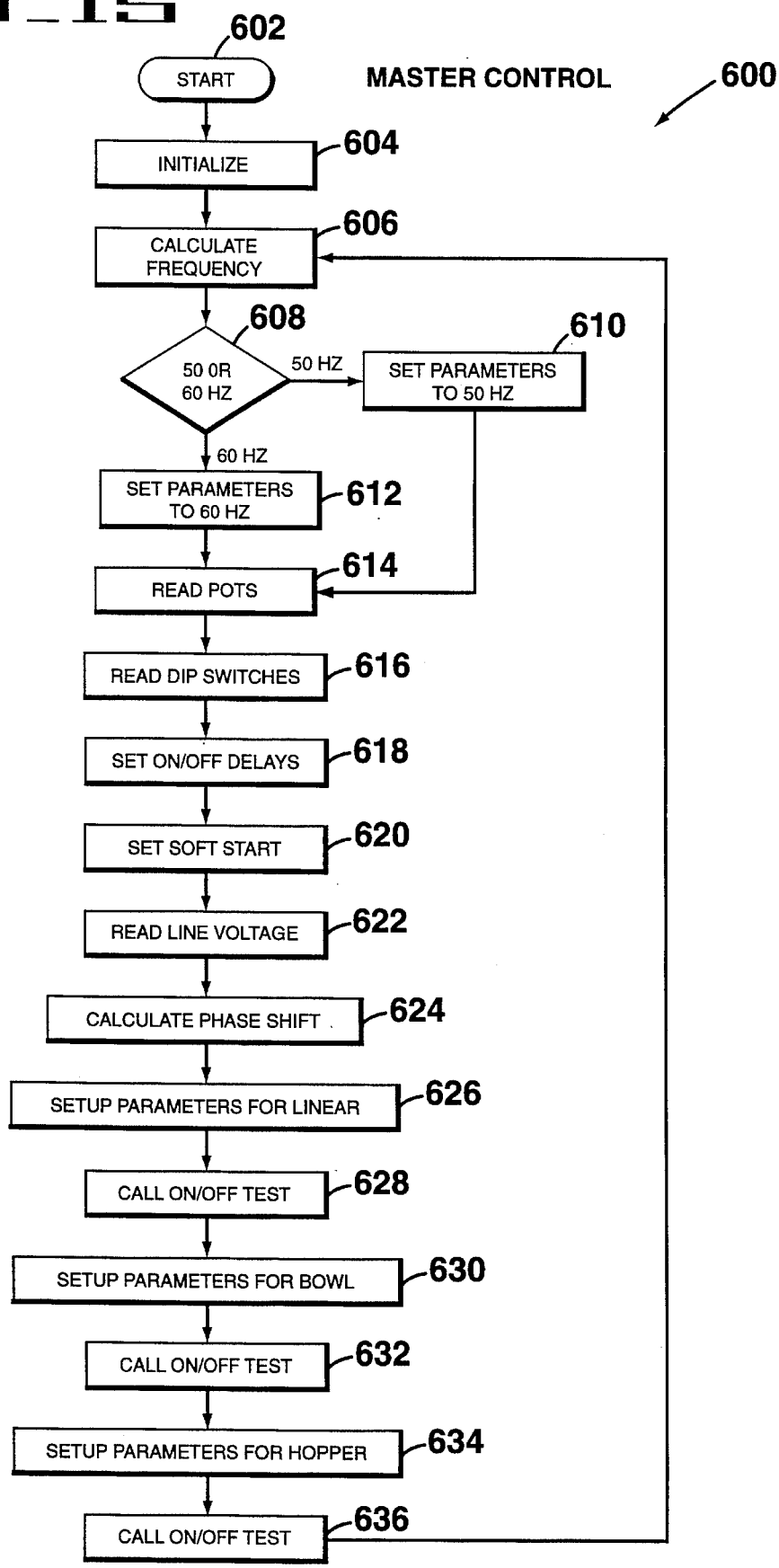

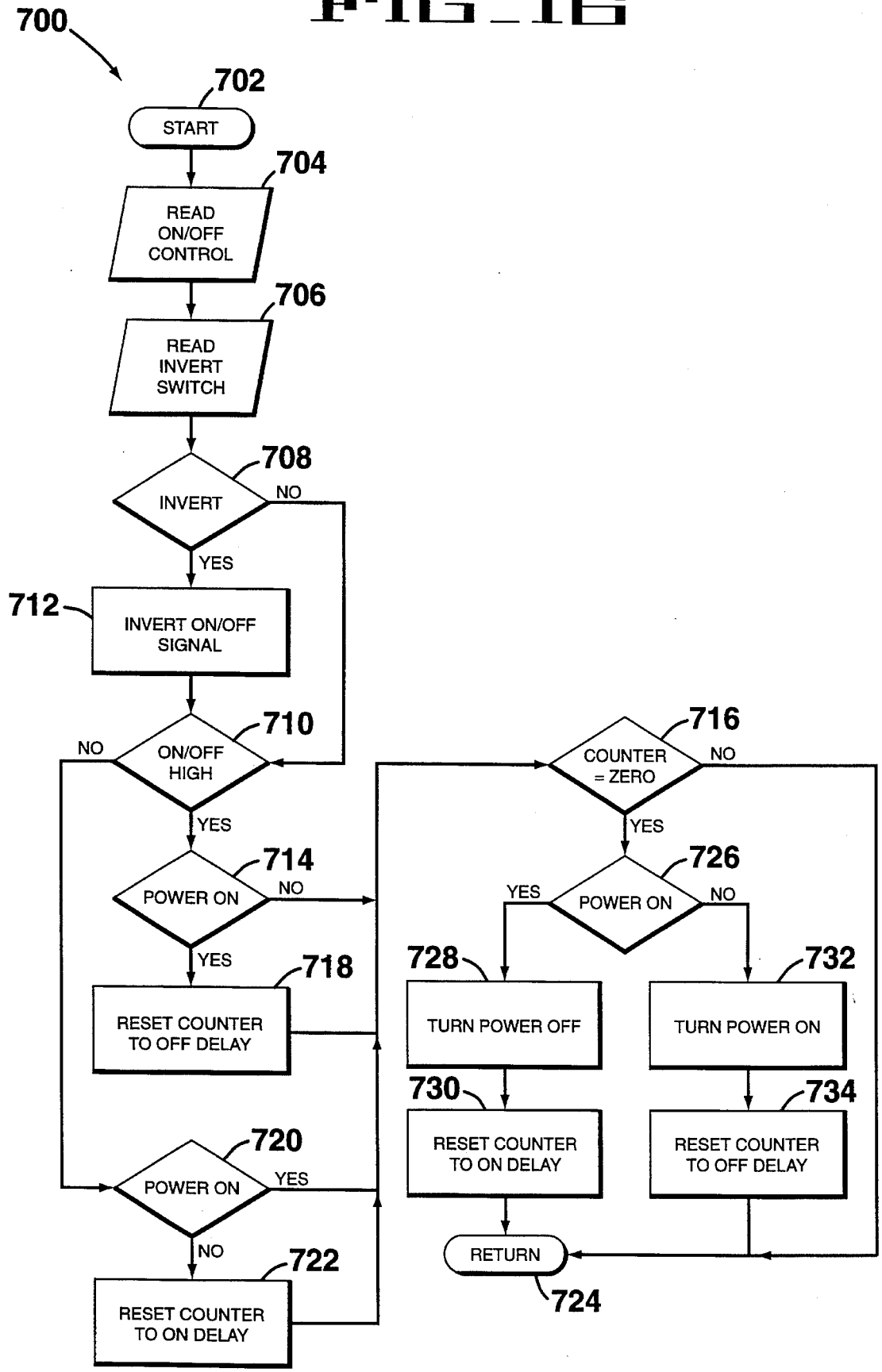
FIG_16

FIG_17
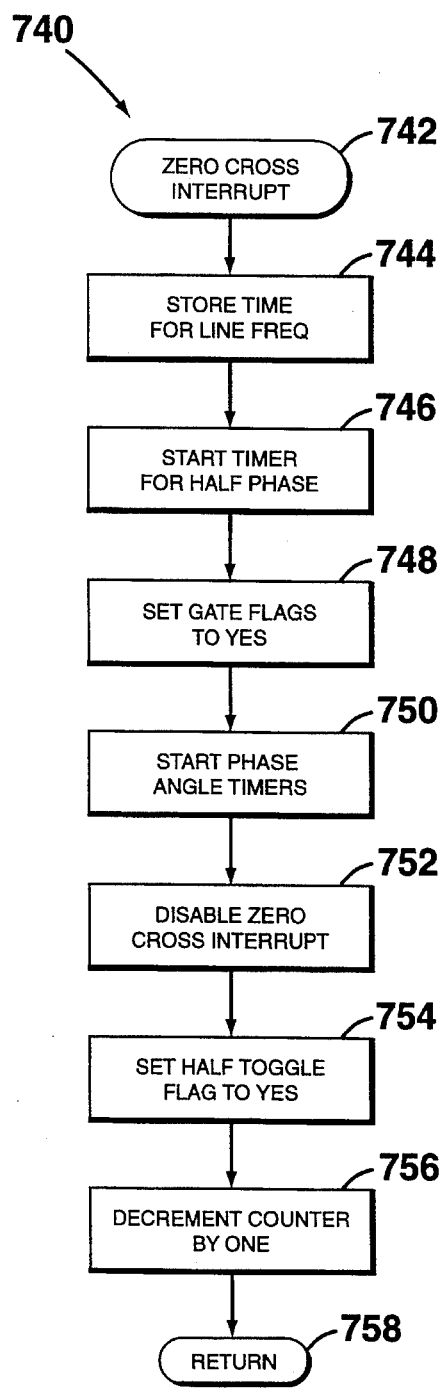
FIG_18
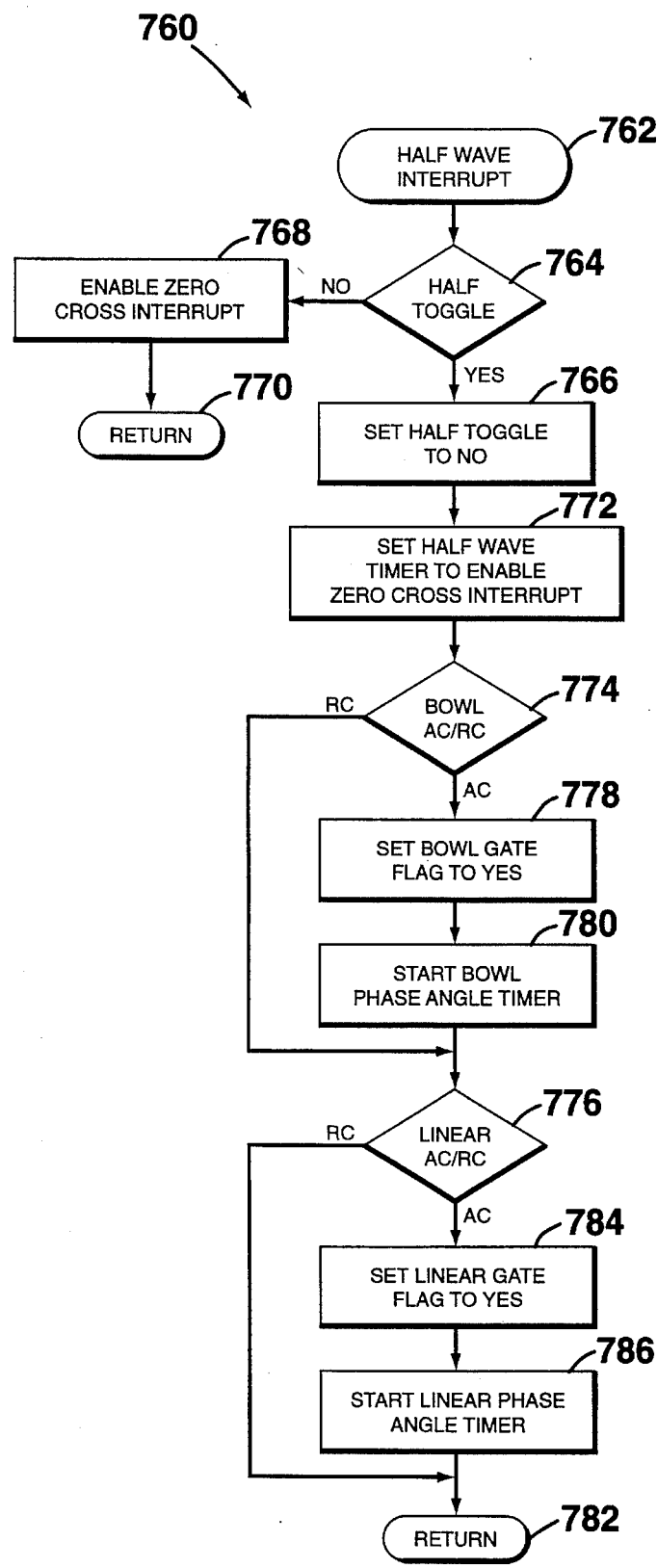

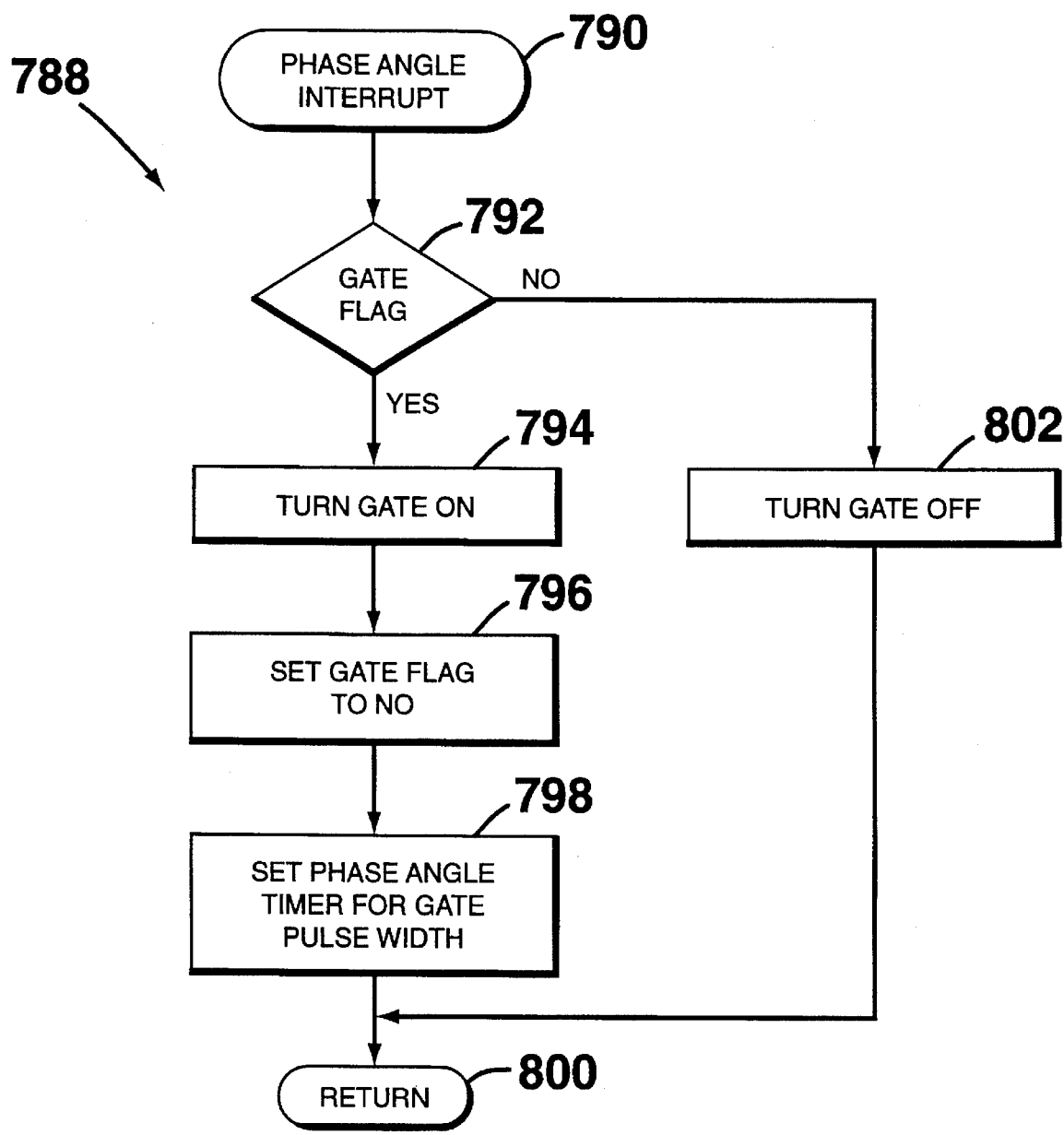
FIG_19

5,561,580

1

CONTROLLER FOR A PART FEED SYSTEM INCLUDING A BLOWN FUSE INDICATOR CIRCUIT

FIELD OF THE INVENTION

This invention relates to micro processing circuits and more particularly to a microcontroller used to control the amplitude and vibration of a part feeder system. This invention further relates to indicators informing the user of a device that a fuse has blown.

BACKGROUND OF THE INVENTION

Part feeder systems may be used to transport such items as widgets. The prior art systems for feeding pans may include a hopper which contains and empties the parts, a bowl feeder for orienting the parts, and a linear feeder for providing the parts to a different location. In the past, relay logic and timers were used to activate the hopper, the bowl feeder, and the linear feeder. However, relay logic and timers may wear in time due to the mechanical nature of the parts and may be rather expensive in cost. Therefore, it is desirable to employ a device for activating the hopper, bowl feeder, and linear feeder which may be more reliable and cheaper in cost.

It is further desirable to employ a circuit which is flexible enough so that it may control the activation of a hopper, bowl feeder, and linear feeder despite the operating voltage or operating frequency of the part feeder system. That is, it is desirable to employ a circuit which can control a part feeder system which may operate at either 60 Hertz (i.e., machines designed for U.S. electrical specifications) or 50 Hertz (i.e., machines designed for European electrical specifications). Further, it is desirable to have a single controller circuit which can control a machine which may operate at either 115 Volts or 230 Volts. Typical prior art relay logic and timers used to control a given part feeder system may not have such a flexibility because the respective relay logic and timers may be designed for that given part feeder system.

It is also desirable to employ a circuit which is capable of turning on components down the conveyor line prior to turning on components up the conveyor line of a part feeder system. Specifically, it is desirable to turn on the linear feeder, bowl feeder, and hopper in a sequential manner. That is, the linear feeder is started before the bowl feeder is started by a given amount of time and the bowl feeder is started before the hopper is started by a given amount of time. This helps prevent the unwanted backlogging of parts along the feeding system.

It is also desirable to employ a circuit which indicates that a fuse has blown for the various components of the part feeder system. In addition, it is desirable that such a circuit will not allow machines at the load to be powered when the associated fuse has blown

SUMMARY OF THE INVENTION

To help achieve these objectives, there is provided a controller for controlling a part feeder system comprising a microcontroller for controlling the activation of a bowl feeder. Alternatively, the controller may control the activation of the bowl feeder, hopper, and linear feeder.

There is also provided a method of controlling the amplitude of vibration of a device for feeding parts comprising the steps of providing a first signal from a microcontroller for activating a linear feeder, providing a second signal from the microcontroller for activating a bowl feeder, and providing a third signal from the microcontroller for activating a hopper.

There is also provided a blown fuse indicator circuit comprising a first diode and a first resister comprising a first series, a second diode and a second resistor comprising a second series, a fuse disposed between one end of the first series and one end of the second series, a zener diode and a light emitting diode comprising a third series which is connected to an opposing end of the first series, and an opto-coupler circuit disposed between one end of the third series, an opposing end of the second series and an opposing end of the third series.

BRIEF DESCRIPTION OF THE DRAWINGS

FIG. 1 is a perspective view of a control box panel for controlling the feeding of a linear feeder, a bowl feeder, and a hopper.

FIG. 2 is a plot of the line voltage, the zero cross signal, the voltage level signal, the gate signal for activating the power semiconductors, and the voltages provides to the magnet circuits of a hopper, bowl feeder and linear feeder.

FIG. 3 is a functional block diagram of the microcontroller and peripheral circuitry in accordance with a preferred embodiment of the present invention.

FIG. 4 is a schematic diagram of a blown fuse indicator circuit of FIG. 3.

FIG. 5 is a schematic diagram of the microcontroller and peripheral circuitry constructed in accordance with a preferred embodiment of the present invention.

FIG. 6 is a schematic diagram of the power supply, the zero cross signal circuitry, and the voltage level circuitry.

FIG. 7 is a schematic diagram of the dip switches for selecting the operating states of the back pressure sensor, system remote, and flow switch, the operating speeds of the bowl feeder and linear feeder, and the ramp start of the bowl feeder.

FIG. 8 is a schematic diagram of the adjustment potentiometers for setting the maximum and minimum output voltages to the bowl feeder as well as the on and off delay time for activating the bowl feeder.

FIG. 9 is a schematic diagram of the back pressure sensor and associated circuitry for providing the back pressure sensor signal to the microcontroller as well as a blown fuse circuit for the back pressure sensor.

FIG. 10 is a schematic diagram of the blown fuse circuitry for the main lines.

FIG. 11 is a schematic diagram of the flow switch and related circuitry.

FIG. 12 is a schematic diagram of the system remote signal and related circuitry.

FIG. 13 is a schematic diagram of various LED's employed by the controller for the part feeder system of the present invention and related circuitry.

FIG. 14 is a schematic diagram of the circuitry for activating the power semiconductors.

FIG. 15 is a flow chart of the main program loop for controlling the operations of the hopper, bowl feeder, and linear feeder.

FIG. 16 is a flow chart of the on/off test subroutine performed by the main program loop of FIG. 15.

FIG. 17 is a flow chart of the zero cross interrupt subroutine.

FIG. 18 is a flow chart of the half wave interrupt subroutine.

FIG. 19 is a flow chart for the phase angle interrupt subroutine used in connection with activating the hopper, bowl feeder, and linear feeder.

DETAILED DESCRIPTION OF THE PREFERRED EMBODIMENTS

Referring to FIG. 1, there is shown a control box 2 which controls the feeding of a hopper 4, a bowl feeder 6, and a linear feeder 8. The control box 2 contains a hopper feeder dial 10, a bowl feeder dial 12, and a linear feeder dial 14 for setting the desired amplitude of vibration for the hopper 4, bowl feeder 6, and linear feeder 8, respectively. The control box 2 further contains an on/off line switch 16. Referring also to FIG. 2, the on/off line switch 16 provides a line voltage 17 (i.e., 50 or 60 Hertz depending upon whether the hopper, bowl feeder, and linear feeder are set for U.S. electrical specifications or European electrical specifications). A back pressure sensor 18 is also provided and senses the flow of parts upon the linear feeder 8.

Referring to FIG. 3, there is shown a functional block diagram of the circuitry 20 housed in the control box 2, hereinafter called the master controller circuitry. A zero cross reference signal 22 is provided to a microcontroller 24. Referring also to FIG. 2, the zero cross reference signal 22 is a fixed square wave and provides a signal of reference for the microcontroller 24 such that functions controlled by the microcontroller may begin at a certain period of time relative to the zero cross reference signal 22. The zero cross reference signal 22 provides, for example, a 5 Volt square wave each time the line voltage 17 is positive in value.

A voltage level circuit 26 is also provided to the microcontroller 24 so that the microcontroller may make adjustments in the phase shift of the signals provided to power semiconductors 28, 30, and 32 relative to the zero cross reference signal 22. Power semiconductor 28 provides the activating power to the hopper 4, power semiconductor 30 provides the activating power to bowl feeder 6, and power semiconductor 32 provides the activating power to linear feeder 8.

The voltage level circuit 26 compensates for variations in the line voltage 17 (i.e., where the line voltage 17 is supposed to be 115 Volts and the line voltage is temporarily higher or lower than 115 Volts). Referring also to FIG. 2, the voltage level circuit 26 comprises a voltage level line 27 which may be, for example 2.5 Volts when the line voltage 17 is 115 Volts. If the line voltage 17 drops temporarily to 110 Volts, then the voltage level line 27 would be slightly less than 2.5 volts. If, however, the line voltage 17 raises temporarily to 120 Volts, then the voltage level line 27 would be slightly more than 2.5 volts. The microcontroller 24 would then calculate the necessary phase delay for activating the power semiconductors 28, 30, and 32 based upon both the variation of the line voltage 17 provided by the voltage level line 27 as well as the settings provided by the respective hopper dial 10, bowl feeder dial 12, and linear feeder dial 14.

When the desired amplitude of excitation is greater for the hopper 4, bowl feeder 6, and linear feeder 8 as determined by the settings of the respective dials 10, 12, and 14, then the phase delay from the zero cross point of the line voltage 17 is smaller. When the amplitude of excitation is smaller, then the phase delay from the zero cross point of the line voltage 17 is larger. For an RC hopper 4, bowl feeder 6, and linear feeder 8 system, the power semiconductor 28, 30, and 32 is only activated during the positive portion of line voltage 17 as shown by signal 29 of FIG. 2. For an AC bowl feeder 6 and linear feeder 8 system, the power semiconductors 28, 30, and 32 would be activated during both the positive and negative portion of the line voltage 17. It should be noted that hoppers are typically RC systems. However, an AC hopper would be activated during the positive and negative portion of the line voltage 17.

Because the power semiconductors 28, 30, and 32 are turned on for a given portion of each phase of the line voltage 17, the standard magnet systems located in each of the hopper 4, bowl feeder 6, and linear feeder 8 charges once the gate signal is turned on and for the remainder of the time that the line voltage 17 is in the positive phase, as shown by magnet line 31. Once the line voltage 17 is in the negative portion of a given phase, then the magnet line 31 discharges as illustrated unless the bowl feeder or linear feeder is an AC system. If this is the case, then the magnet line may be charged during both the positive and negative portion of line voltage 17.

Referring to FIG. 3, dip switch settings provide the proper state required for activating various parts of the system. System remote dip switch 34 provides the signal state required to activate the linear feeder 8. For example, when dip switch 34 is set to the normally open state, the linear feeder 8 operates when 115 Volts is applied to the system remote signal line 64 to be discussed. When the dip switch 34 is set to the normally closed state, the linear feeder 8 operates when 115 Volts is not applied to the system remote signal line 64.

A back pressure sensor dip switch 36 provides the signal state required to activate the bowl feeder 6. For example, when dip switch 36 is set to the normally open state, the bowl feeder 6 runs when the contact is open. A flow dip switch 38 provides the signal state required to run the hopper 4. For example, when dip switch 38 is in the normally open state, the hopper 4 runs when the contact is open. A bowl feeder dip switch 40 and a linear feeder dip switch 42 may be provided to select the operating speeds for the bowl feeder 6 and linear feeder 8. For example, these dip switches may allow the user to select between the speeds of 7200 cpm (AC) or 3600 cpm (RC). One or more soft start dip switches 44 may also be provided to control the bowl feeder ramp start rate (i.e., the rate at which the bowl feeder 6 ramps up to full speed). For example, the dip switches 44 may select between having a zero ramp start, a 0.7 second ramp start, a 1.2 ramp start, and a 1.9 second ramp start.

Adjustment potentiometers 46 and 48 are provided to set the maximum and minimum output voltage to the hopper 4, respectively. Adjustment potentiometers 50 and 52 may also provided to set the maximum and minimum output voltages to the bowl feeder 6. Further, adjustment potentiometers 54 and 56 may also provided to set the maximum and minimum output voltages to the linear feeder 8.

Adjustment potentiometers are also provided to set the time delay in starting and stopping the bowl feeder 6 after the back pressure sensor 18 has been activated. For example, adjustment potentiometer 58 may set a time delay of zero to fifteen seconds for starting the bowl feeder 6 after the appropriate signal has been sent by the back pressure sensor 18 for activation of the bowl feeder. Further, adjustment potentiometer 60 may set a time delay of zero to fifteen seconds for stopping the bowl feeder after the appropriate signal has been sent for stopping the bowl feeder.

Referring to both FIGS. 1 and 3, the back pressure sensor 18 is placed along the linear feeder 8 to allow sufficient queue (i.e., to ensure that too many pans do not compile upon the linear feeder) as is typical in the industry. When the back pressure sensor 18 senses the absence of light because the line feeder has too many parts thereon and such an absence of light occurs for the period of time set by the adjustment potentiometer 60, the microcontroller 24 may then signal the bowl feeder 6 and hopper 4 to turn off. When the back pressure sensor 18 senses the presence of light because the line feeder has too few parts thereon and such a presence of light occurs for the period of time set by the adjustment potentiometer 58, then the microcontroller 24 signals the bowl feeder 6 and hopper 4 to turn on. That is, a time period is provided by which the back pressure sensor 18 is in a given state prior to turning on the bowl feeder 6 and a time period is provided by which the sensor is in a different state prior to turning off said bowl feeder 6. It should be noted that, preferably, a standard opto-isolator should be employed to prevent noise spikes when reducing the voltage of the back pressure sensor 18 to the operating voltage of the microcontroller 24.

A flow switch 62 provides the signal for triggering the operation of the hopper 4. As noted above, when flow dip switch 38 is in the normally open state, the hopper 4 runs when the contact is open. Further, when flow dip switch 38 is in the normally closed state, the hopper 4 runs when the contact is closed.

A system remote signal line 64 provides the signal required to activate the system. In a preferred embodiment, the feeder system is sequentially started. That is, the linear feeder 8 is started prior to the bowl feeder 6 which is, in turn, started before the hopper 4. In such a case, the signal remote signal line 64 activates the linear feeder 8 because this is the first component in the system to be turned on.

As stated earlier, when the system remote dip switch 34 is set to the normally open state, the system operates when 115 Volts is applied to the system remote signal line 64. When the dip switch 34 is set to the normally closed state, the system operates when 115 Volts is not applied to the system remote signal line 64. The voltage of the system remote signal line 64 may be 115 Volts and thus the voltage must be reduced to the 5 Volt operating voltage of the microcontroller.

The microcontroller 24 provides an output hopper signal 66 for activating the hopper 4 via power semiconductor 28. Because the voltage of the output hopper signal 66 is at the operating voltage of the microcontroller 24 which may be 5 Volts, the output hopper signal 66 voltage must be increased to either 115 Volts or 230 Volts in order to run the hopper 4. It is preferable to raise the voltage of output hopper signal 66 to 12 Volts prior to the final voltage of 115 Volts or 230 Volts in order to keep higher voltages away from the microcontroller 24. As before, standard opto-isolator circuits may be used when raising the output hopper signal voltage from 5 Volts to 12 Volts and from 12 Volts to either 115 Volts or 230 Volts. Similarly, the microcontroller 24 provides an output bowl feeder signal 68 to the power semiconductor 30 and provides an output linear feeder signal 70 to the power semiconductor 32.

The microcontroller 24 may also provide output signals to various LED's to inform the user of various conditions provided by the system. LED's 72, 74, and 76 may be provided to indicate that power is being supplied to the hopper 4, bowl feeder 6, and linear feeder 8, respectively. Further, LED 78 may be used to indicate that the system logic is working and may, for example, blink on and off to indicate the that the system logic is working.

LED 80 may also be provided to indicate that conditions are correct for the system to run. As stated earlier, when system remote dip switch 34 is set to the normally open state, the system operates when 115 Volts is applied to the system remote signal line 64. When the dip switch 34 is set to the normally closed state, the system operates when 115 Volts is not applied to the system remote signal line 64. LED 80 may be activated when either of these two conditions is satisfied.

Referring also to FIG. 4, a blown fuse indicator circuit 82 is shown for indicating whether a fuse such as for the hopper 4, bowl feeder 6, linear feeder 8, and back pressure sensor 18 has been blown. A blown fuse circuit 82 may also be provided to indicate whether the main line fuses or any other fuses which may be employed have been blown. For example, the blown fuse indicator circuit shown in FIG. 4 may be applied to any fuse such as a fuse for a consumer appliance, automotive and airline fuses, or any other types of fuses used.

The blown fuse circuit 82 contains a fuse 84 being monitored. One end of the fuse 84 is connected to a line 86 and the other end of the fuse 84 is connected to the load 88. A first diode 90 is connected in series with a first resistor 92 from line 86. A second diode 94 is connected in series with a second resistor 96 from the load 88. The first resistor may be connected to a first input 98 of an opto-coupler circuit 100 and the second resistor 96 may be connected to a second input 102 of the opto coupler circuit 100. The first resistor 92 may also be connected to a zener diode 104 which is in turn connected to an LED 106. The output of the opto coupler circuit 100 and the LED 106 is connected to point 108. Further, a capacitor 110 is connected in parallel with zener diode 104 and LED 106. It should be mentioned that although diode 90 and resistor 92, diode 94 and resistor 96, and zener diode 104 and LED 106 are shown in a given order, each of these pairs of times may be reversed in order (i.e., resistor 92 may be connected to line 86 and diode 90 may be connected to input 98).

Preferably, the diodes 90 and 94 are identical components and resistors 92 and 96 are identical components. The diodes 90 and 94 may be IN4007 diodes and resistors 92 and 96 may be 39K Ohm resistors. The opto coupler circuit 100 may be a 4N29 opto coupler circuit. Zener diode 104 may be a standard 3 Volt zener diode and LED 106 may be a standard light emitting diode.

During normal operation, the fuse 84 acts as a short circuit and thus points 86 and 88 are at the same potential. In a preferred embodiment, because the diodes 90 and 94 are identical components and resistors 92 and 96 are identical components, the potential at points 98 and 102 are the same. The resistor values 92 and 96 are chosen to be high enough so that the zener diode 104 will not turn on during normal operation. As a result, no current will conduct past the zener diode 104 and thus the LED 106 remains off.

When the fuse 84 is blown, an open circuit results between points 86 and 88. As a result, all of the current is provided via the first diode 90 and the first resistor 92 to the zener diode 104, providing a high enough voltage to turn on the zener diode 104. LED 106 is thus activated indicating to the user that a fuse has blown and needs to be replaced.

The blown fuse indicator circuit 82 may not allow any voltage to pass to the load 88 because the opto coupler circuit 100 will not allow voltages of up to approximately 12,000 Volts to pass when the fuse 84 has blown. This benefit is highly desirable because machines at the load will not be powered when the associated fuse 84 has blown.

FIGS. 5 through 14 show an example of a master controller 20 in accordance with a preferred embodiment of the present invention. Similar items have been labeled similarly for purposes of clarity.

Referring specifically to FIG. 5 there is shown a microcontroller 24. Preferably, the microcontroller 24 is a Motorola 68HC11 micro processor. Referring also to FIG. 6 there is shown a schematic of the power supply, the zero cross signal circuitry, and the voltage level circuitry. Line 112 and 114 may provide either a 115 Volt or 230 Volt input. Line 112 is provided to fuse 116 and line 114 is provided to fuse 118. Fuses 116 and 118 are in turn provided to a terminal block 120 which provides a connection to a pc board 125. The voltage of line 112, via the fuse 116 and terminal block 120, is provided to point 122 in the circuit. Similarly, the voltage of line 114 is provided to point 124. A 10,000 pF capacitor 126 and a 250 Volt varistor 128 are connected in parallel between points 122 and 124. Further, point 122 is connected to the first input 130 of terminal block 132 and point 124 is connected to the fourth input 134 of terminal block 132.

Further, point 122 is connected to one end of a winding 136 of a transformer 138 and the third input 140 of terminal block 132 is connected to an opposing end of winding 136. Point 124 is connected to one end of a winding 142 of transformer 138 and the second input 144 is connected to an opposing end of winding 142.

A first output 146 of transformer 138 is provided to diode 148 and a second output 150 is provided to diode 152. The output of diodes 148 and 152 are provided to capacitor 154 and a voltage regulator 156. The output 158 of voltage regulator 156 provides a 5 Volt voltage. This 5 Volt voltage may be used to power microcontroller 24. Output 158 is connected to capacitor 162. The opposing end of capacitors 154 and 162 as well as a second input to voltage regulator 156 is connected to a third output 164 of transformer 138. The third output 164 provides a 5 Volt ground reference potential.

A fourth output 166 of transformer 138 is provided to diode 168 and a second output and 172 is provided to diode 172. The output of diodes 168 and 170 are provided to capacitor 174 and a voltage regulator 176. The output 178 of voltage regulator 176 provides a 12 Volt voltage. This 12 Volt voltage may be applied, for example, to stepping down a higher voltage signal (i.e., 115 Volts) before it is stepped down once again to the operating voltage of microcontroller 24. Output 178 is connected to capacitor 182. The opposing end of capacitors 174 and 182 as well as a second input to voltage regulator 176 is connected to a sixth output 184 of transformer 138. The sixth output 184 provides a 12 Volt ground reference potential.

Preferably, diodes 148, 152, 168, and 172 are 1N4007 diodes. Further, preferably capacitors 154 and 174 are 3300 MF capacitors, and capacitors 162 and 182 are 2.705 MF capacitors. Moreover, preferably voltage regulator 156 is a LM7805CTB voltage regulator and voltage regulator 176 is a LM7812CTB voltage regulator.

The outputs 150, 146, and 164 of transformer 138 are provided to a voltage level circuit 26. As stated earlier, the voltage level circuit 26 allows for adjustments in the phase shift of signals provided to the power semiconductors which, in turn, drive the hopper 4, the bowl feeder 6, and the linear feeder 8. This phase shift is desirable to compensate for variations in the line voltage 17.

The second output 150 of transformer 138 is applied to diode 186. Further the first output 146 of transformer 138 is provided to diode 188. Preferably, diodes 186 and 188 are 1N4007 diodes. The output of diodes 186 and 188 is provided to one end of a 50 MF capacitor 190 as well as a zener diode 192. The zener diode is preferably a 1N4740 diode. The output 194 of zener diode 192 is provided to a 1.2K Ohm resistor 196 which is, in turn, connected to the opposing end of capacitor 190 as well as the third output 164 of transformer 138.

Signal line 194 is the output of the voltage level circuit 26. Referring also to FIG. 5, signal line 194 is provided to input PE3 of microcontroller 24.

The second output 150 of transformer 138 is also provided to diode 198. Preferably, diode 198 is a 1N4007 diode. The output of diode 198 is provided to a 1.2K Ohm resistor 200. The output of resistor 200 is provided to the base of transistor 202. Preferably, transistor 202 is a MPS4124 transistor. The output of resistor 200 is also provided to a zener diode 204. Preferably, zener diode 204 is a 1N4740 diode. The output of zener diode 204 and the emitter of transistor 202 are connected to the 5 Volt ground line 164. In addition, the 5 Volt line 158 is provided to a 1.2K Ohm resistor 206 which is, in turn, connected to the collector of transistor 202. This provides the zero cross reference signal 22. As stated earlier, the zero cross reference signal provides a signal of reference for the microcontroller 24. The zero cross reference signal 22 is provided to pin PA0 of the microcontroller 24.

FIG. 7 provides a schematic diagram of various dip switches used for selecting the operating states of the back pressure sensor 18, the system remote signal line 64, and flow switch 62, the operating speeds of the bowl feeder 6 and linear feeder 8, and the ramp start of the bowl feeder 6. As stated earlier, a bowl feeder dip switch 40 allows the user to select the operating speed of the bowl feeder 6. One end of dip switch 40 is connected to the 5 Volt ground line 164. The other end of dip switch 40 is connected to line 208. Line 208 is connected to pin PC0 of the microcontroller 24. Further, line 208 is connected to a 4.7K Ohm resistor 210 which is, in turn, connected to the 5 Volt line 158. Similarly, the linear feeder dip switch 42 is connected to line 212 as well as to a 4.7K Ohm resistor 214 which is, in turn, connected to the 5 Volt line 158. Line 212 is connected to pin PC6 of the microcontroller 24 and allows the user to select the operating speed of the linear feeder 8.

In a similar fashion, dip switches 44a, 44b, 36, 34, and 38 are connected to lines 216, 218, 220, 222 and 224 as well as to 4.7K Ohm resistors 226, 228, 230, 232, and 234 which are, in turn, connected to the 5 Volt line 158. Dip switch 36 provides the contact state required to activate the bowl feeder 6 and line 220 is connected to pin PC3 of microcontroller 24. Dip switch 34 provides the contact state required to activate the system and line 222 is connected to pin PC4 of the microcontroller 24. Dip switch 38 provides the contact state required to activate the hopper and line 224 is connected to pin PC5 of microcontroller 24.

Dip switches 44a and 44b are connected to lines 216 and 218, which are, in turn, connected to pins PC1 and PC2 of the microcontroller 24. These dip switches 44a, 44b control the bowl feeder ramp start rate. For example, no ramp occurs when both switches are set to the off position. A 0.7 ramp occurs when dip switch 44a is on and 44b is off. A 1.2 ramp occurs when dip switch 44b is on and 44a is off. Finally, a 1.9 ramp may occur when both switches are on.

Referring to FIG. 8, there is shown a schematic diagram of the adjustment potentiometers 50, 52, 58, and 60. As stated earlier, adjustment potentiometers 50 and 52 set the maximum and minimum output voltages to the bowl feeder 6, respectively. Further, potentiometers 58 and 60 set the time delay in starting and stopping the bowl feeder 6 after the back pressure sensor 18 has been activated. The minimum and maximum values of the vibration of the linear feeder and hopper are preferably programmed into the software of the microcontroller 24. One end of the potentiometers 50, 52, 158, and 60 is connected to the 5 Volt line 58 and the opposing end is connected to the 5 Volt ground line 164. The outputs 236, 238, 240, and 242 of potentiometers 50, 52, 58, and 60 are provided to pins PE4, PE5, PE6, and PE7 of microcontroller 24.

Referring to FIG. 9, there is shown the back pressure sensor 18 and related circuitry. Specifically, a standard back pressure sensor 18 is placed along the linear feeder 8 to determine whether there are too many or too few parts on the linear feeder. The back pressure sensor 18 is connected to inputs 244 and 246 on terminal block 248 for connecting the back pressure sensor signal to the pc board. Input 244 is also connected to a 1K Ohm resistor 250 which is, in turn, connected to the 12 volt line 178. Input 246 of terminal block is connected to a first input 252 of an opto-isolator 254. The second input 256 of opto-isolator 254 is connected to the 12 volt ground 184. Preferably, opto-isolator 254 is a PS2501-4NEC opto-isolator. A first output 258 of opto-isolator 254 is connected to a 1.2K-Ohm resistor 260 which is, in turn, connected to the 5 volt line 158. In addition, the second output of opto-isolator 254 is connected to the 5 V ground 164. Output 258, which is the corresponding 5 volt signal provided by back pressure sensor 18, is inputted into pin PD3 of micro processor 24.

A blown fuse circuit 82a as described in relation to FIG. 4 is provided for the back pressure sensor fuse 84a. A suffix of "a" follows each of components of the back pressure sensor blown fuse circuit for purposes of clarity. Line 88a is connected to input 262 of terminal block 248 thus connecting the blown fuse circuit 82a to the load (i.e., the back pressure sensor 18). Line 86a is connected to main line 266 and line 108a is connected to main line 268. Line 266 and 268 provide power to the back pressure sensor 18 from main lines 272 and 274 as shown in FIG. 10.

Specifically, there is shown a terminal block 270 for connecting the main line signals 272 and 274 to the pc board. A blown fuse circuit is also provided for the main lines 272 and 274. The blown fuse circuit of FIG. 4 is shown for each main line 272 and 274 with the addition of suffixes "b" and "c" after each respective component for purposes of clarity.

Referring to FIG. 11, there is shown a flow switch 62 which is provided to terminal block 300, allowing for connection to the pc board. One input 302 is connected to a 1K Ohm resistor 304 which is, in turn, connected to the 12 volt line 178. The second input 306 of terminal block 300 is connected to a first input of an opto-isolator 308. Preferably, opto-isolator 308 is a PS2501-4NEC opto-isolator. A second input of opto-isolator 308 is provided by the 12 V ground line 184. The output 310 of opto-isolator 308 is provided to a 1.2K Ohm resistor 312 which is, in turn, connected to the 5 Volt line 158. A second output of the opto-isolator circuit 308 is provided to the 5 Volt ground 164. As a result, line 310 provides a 5 volt signal corresponding to the 12 volt flow switch signal and thus may be inputted into pin PD5 of microcontroller 24.

Referring to FIGS. 3 and 12, the system remote signal 64 is provided to terminal block 314 in order to connect the same to the pc board. A first terminal 316 of terminal block 314 is provided to a 3.7K Ohm resistor 318 which is, in turn, provided to a diode 320. Preferably, diode 320 is a 1N4007 diode. The second terminal 322 of terminal block 314 is provided to zener diode 324 and a first input to opto-isolator 326. Preferably, the zener diode 324 is a 1N4740 diode and opto-isolator 326 is a 4N29P opto-isolator. The output of zener diode 324 is connected to diode 320 as well as a 1K Ohm resistor 328 which is, in turn, connected to a second input of opto-isolator 326. A 100 MF capacitor 330 is placed in parallel with the zener diode 324.

One end of a 4.7K Ohm resistor 332 is connected to a first output of opto-isolator circuit 326 and an opposing end is connected to the 12 volt line 178. The 12 volt line 178 is further connected to a 1K Ohm resistor 334 which is, in turn, connected to a first input opto-isolator 336. Preferably, opto-isolator 336 is a PS2501-4NEC opto-isolator circuit.

A second output of opto-isolator circuit 326 is connected to the base of transistor 338. Preferably, transistor 338 is a MPS4 124 transistor. The second output of optoisolator circuit 326 is also provided to a 4.7K Ohm resistor 340 which is, in turn, connected to the 12 volt ground 184 as well as the emitter of transistor 338. The collector of transistor 338 is provided to a second input of opto-isolator 336.

Output 342 of opto-isolator 336 is connected to a 1.2K Ohm resistor 344 which is, in turn, connected to the 5 volt line 158. The second output of opto-isolator 336 is provided to the 5 volt ground 164. Output 342 is a 5 volt signal corresponding to the line voltage 17 which may be 115 volts. Output 342 is provided to pin PD4 of the microcontroller.

Referring to FIG. 13, there are shown various LED's employed by the master controller 20. As stated earlier, LED's 72, 74, and 76 may be provided to indicate that power is being supplied to the hopper 4, bowl feeder 6, and linear feeder 8, respectively. Further, LED 78 may be used to indicate that the system logic is working. Moreover, LED 80 may be used to indicate that conditions are correct for the system to run.

One end of LED 80 is tied to the 5 volt ground 164 and the other end of LED 80 is connected to the emitter of transistor 346. The collector of transistor 346 is connected to a 1.2K Ohm resistor 348 which is, in turn, connected to the 5 Volt line 158. The base of transistor 346 is provided to a 1.2K Ohm resistor 350 which is, in turn, connected to line 352. Line 352 is connected to pin PB1 of microcontroller 24.

Similarly, LED 72, by the use of transistor 354 and 1.2K Ohm resistors 356, 358, is provided to line 360; LED 76 by the use of transistor 362 and 1.2K Ohm resistors 364, 366, is provided to line 368; LED 74, by the use of transistor 370 and 1.2K Ohm resistors 372, 374, is provided to line 376; and LED 78 by the use of transistor 378 and 1.2K Ohm resistors 380, 382, is provided to line 384. Lines 360, 368, 376, and 384 are provided to pins PB4, PB3, PB2, and PB0 of microcontroller 24, respectively. Preferably, transistors 346, 354, 362, 370 and 378 are MPS4124 transistors.

Referring to FIG. 14, the microcontroller 24 output pin PA5 is provided via line 386 to a 2.2K Ohm resistor 388 to the base of transistor 390. Line 386 provides the gate signal 29 as shown in FIG. 2. Preferably, transistor 390 is a MPS4124 transistor. The emitter of transistor 390 is connected to the 5 volt ground 164 and the collector of transistor 390 is connected to one input of opto-isolator 392. Preferably, opto-isolator 392 is a PS2501-4NEC opto-isolator. The 5 Volt line 158 is connected to a 270 Ohm resistor 394 which is, in turn, connected to a second input of opto-isolator 392.

One output of opto-isolator 392 is connected to a 4.7K Ohm resistor 398 which is, in turn, connected to the base of transistor 400. Preferably, transistor 400 is an MPS4124 transistor. The second output of transistor 392 is provided to the 12 volt ground 184. A 0.005 MF capacitor 402 is placed in parallel with the emitter and collector of transistor 400. The collector of transistor 400 is provided to a first input of opto-isolator 404 and a second input to opto-isolator 404 is provided by a 1K Ohm resistor 396. The opposing end of resistor 396 is provided to a twelve volt supply 178 as well as to one end of a 4.7K Ohm resistor 394' which is in turn connected to one end of resistor 398, as shown in FIG. 14. Preferably, opto-isolator 404 is a MOC 3020N opto-isolator.

A first output 405 of opto-isolator 404 is provided to a 330 Ohm resistor 406. The output of resistor 330 is provided to a 0.1 MF capacitor 408 which is also connected to the second output 409 of opto-isolator 404. Resistor 406 is connected to a 3K Ohm resistor 410 which is, in turn, connected to a 250 volt varistor 412, a second terminal 414 of terminal block 416, and triac 418. Preferably, triac 418 is a Q6015 L5 triac. One terminal of triac 418 is connected to a 1.2K Ohm resistor 420 and the second output 409 of opto-isolator 404. A first terminal of terminal block 416 is connected to ground and the output of varistor 412 is provided to a third terminal of terminal block 416. Terminal block 416 provides the power semiconductor 28 for the hopper 4 with the appropriate signal for activating the hopper.

The second output 409 of opto-isolator 404 is also connected to a hopper blown fuse circuit 82d as described in connection with FIG. 4. For purposes of clarity, a "d" suffix is provided to show all circuit components in relation to the hopper blown fuse circuit 82d. As before, power line 266 is connected to one end of fuse 84d and power line 268 is connected to one end of the opto-isolator circuit 100d. If fuse 84d blows, LED 106d will light up and the blown fuse circuit will prevent any conduction of the line voltages to the power semiconductor 28.

Referring to FIGS. 3 and 5 as well, pin PA4 of microcontroller 24 is connected to power semiconductor 32 for powering the linear drive 8 from line 422 in a similar manner as was done by line 386 to power the hopper semiconductor 28. Moreover, a blown fuse circuit 82 may be employed for a linear feeder fuse in a manner similar to the hopper blown fuse circuit 82d.

Pin PA3 of microcontroller 24 also is connected to power semiconductor 30 for powering the bowl feeder 6 from line 424 in a similar manner as was done by line 386 to power the hopper semiconductor 28. However, preferably, a higher current rated triac is used because more power may be needed to activate the bowl feeder 6. Further, the value of resistor 410 would preferably be 510 Ohms in such a case. In addition, a blown fuse circuit 82 may be employed for a bowl feeder fuse in a manner similar to the hopper blown fuse circuit 82d.

Referring to FIGS. 1 and 5, the hopper feeder dial 10, the bowl feeder dial 12, and the linear feeder dial may be provided to pins PE2, PE0, and PE1 of microcontroller 24 via lines 426, 428, and 430 respectively. In addition, the 5 Volt signal line 158 is connected to pins MODB/VSTBY 500 and VRH 502 of the microcontroller 24 as well as to a 1.1 MF capacitor 504. The opposing end of capacitor 504 is connected to the 5 Volt ground line 164 which is also connected to pins MODA/LIR 506 and VRL 508 of the microcontroller 24. This circuit provides a mode of operation for the Motorola 68HC11 micro processor 24.

The 5 Volt line 158 is also provided to a 10K Ohm resistor 510 as well as to a reset level integrated circuit 512 which is preferably a MC34064 integrated circuit. On output of circuit 512 is connected to the 5 Volt ground line 164. A second output of circuit 512 is provided to a 4.7K Ohm resistor 514 which is in turn connected to resistor 510 as well as to the reset pin 516 of micro processor 24. This circuitry holds the reset during the power up of the micro processor 24 so that the micro processor may then begin operating once it has been properly powered to the required level.

The 5 Volt ground line 164 is further provided to 22 pF capacitors 518 and 520. A 8 MHertz crystal 522 and a 10M Ohm resistor 524 are placed in parallel at the opposing end of capacitors 518 and 520. Capacitor 518 is connected to the XTAL pin 526 and capacitor 520 is connected to the EXTAL pin 528 of micro processor 24. This circuitry provides a 8M Hertz operating frequency to the micro processor which may, for example, operate at 2M Hertz.

Referring to FIGS. 15 through 19 there is shown a flow chart diagrams of the source code program contained in the microcontroller 24 for controlling the operation of the hopper 4, bowl feeder 6, and linear feeder 8. Referring specifically to FIG. 15, there is shown the main program loop 600 for controlling the operation of the hopper 4, bowl feeder 6, and linear feeder 8. The start block 602 indicates that the program has been requested by turning on the power to the system. An initialize sequence 604 is then performed in order to initialize parameters, such as clearing the timers and loading values for the program. A calculate frequency sequence 606 is then performed in order to determine whether the operating power is a 60 Hz or 50 Hz which is provided to decision block 608. If the operating frequency is 50 Hz, then block 610 provides values to the program related to 50 Hz calculations. If the operating frequency is 60 Hz, then block 612 provides values to the program related to 60 Hz.

Referring also to FIG. 3, the program then reads the settings of the bowl power maximum potentiometer 50, the bowl power minimum potentiometer 52, the back pressure on delay potentiometer 58, and the back pressure off delay potentiometer 60 as noted by the read pots block 614. The program also reads the settings of the bowl feeder dip switch 40, the soft start dip switches 44, the back pressure sensor dip switch 36, the system remote dip switch 34, the flow dip switch 38, and the linear feeder dip switch 42 as noted by the read dip switches block 616. Once the potentiometer and dip switch settings have been provided, the program sets the delays provided by the back pressure on delay potentiometer 58, the back pressure off delay potentiometer 60 as well as the on and off delays preferably preprogrammed into the microcontroller 24 software for the linear feeder 8 and the hopper 4 as noted by the set on/off delays block 618. The program also sets the bowl feeder ramp start provided by the soft start dip switch 44 as noted by the set soft start block 620.

Subsequently, the voltage of the voltage level line 27 of FIG. 2 is read into the program as noted by the read line voltage block 622. The appropriate phase shift (i.e., delay from when the appropriate power semiconductor is activated relative to the zero cross point to compensate for the fluctuation of the line voltage 17) is calculated in the calculate phase shift block 624 of the main program loop 600. Once the appropriate phase angle timer reaches the required count, it activates the phase angle interrupt subroutine 788 for each of the hopper, bowl feeder, and linear feeder to be described.

The program is ready to setup the parameters necessary to drive the linear feeder 8 as noted by block 626 and forwards to block 628. Referring also to FIG. 16, block 628 calls up the on/off test subroutine 700. Subroutine 700 makes the decision as to whether the power should be turned on or off for each of the hopper 4, bowl feeder 6 and linear feeder 8 and sets the delays counters for appropriately turning on or off one of these components at the desired time.

The subroutine 700 is started and reads the on/off control signal as noted by blocks 702 and 704, respectively, and provides it to the invert decision block 708. The on/off control signal for the linear feeder is the system remote signal 64. The read invert switch block 706 reads the system remote dip switch 34. If the system remote dip switch 34 is in the normally open state (i.e., the system runs when 115 Volts is applied), the program goes directly to the on/off high block 710. If the system remote dip switch is in the normally closed state (i.e., the system runs when 0 Volts is applied), the program goes to the invert on/off signal block 712 which inverts the signal and is then provided to the on/off high block 710.

The on/off high block 710 is a flag detecting block. If a flag is sensed in the on/off high block 710, then the program goes to decision block 714 to determine whether the system power has been on. If the answer is no, then the program forwards to the counter equals zero decision block 716. If the power has been on, the program forwards to block 718 to reset the counter, not shown, to the time specified to turn off the linear feeder 8, that is, the linear feeder off delay time. This time is preprogrammed into the microcontroller and may be, for example, zero to a half a second. The program then forwards to block 716.

If a flag is not sensed in the on/off high block 710, then the program forwards to decision block 720. If the power has been on, then the program forwards to decision block 716. If not, then the program forwards to block 722 to reset the counter to the time specified to turn on the linear feeder 8, that is, the linear feeder on delay time. This time is also preprogrammed into the microcontroller and may be for example, one-fourth to a half a second. The time specified to turn on the linear feeder should be at least one-fourth of a second in order to ensure that noise spikes do not activate the starting of the linear feeder.

Decision block 716 determines whether the counter is set to zero. If the answer is no, the program forwards to block 724 which returns the program sequence from subroutine 700 to the main program 600. If the counter is set to zero, then the program forwards to decision block 726. If the power for the linear feeder has been on, then the program forwards to block 728 which turns the power to the linear feeder off. Further, the program forwards to block 730 which resets the counter to the linear feeder on delay time in order to prepare the system should the system be turned on in the future. Then, the program proceeds to block 724. If the power was not on, the program forwards to block 732 which turns the power on. The program forwards to block 734 which resets the counter to the linear feeder off delay time in order to prepare the system should the system be turned off in the future. The program then forwards to block 724, returning the program sequence from subroutine 700 to the main program 600.

The program forwards to block 630 which indicates that it is now ready to set up the parameters necessary to drive the bowl feeder 6. The program forwards to block 632 which calls again subroutine 700. However, this time, the focus is upon the bowl feeder. Specifically, the on/off control signal read by block 704 for the bowl feeder is the back pressure sensor signal 18. The read invert switch block 706 for the bowl feeder is the back pressure sensor dip switch 36. The invert block 708 makes the determination as to whether it is necessary to invert the signal state required to activate the bowl feeder. This is similar to the decision described in relation to the system remote dip switch. Further, the power on decision blocks 714, 720, and 726 refer to the power of the bowl feeder rather than the linear feeder. Moreover, the reset counter to off delay blocks 718 and 734 as well as the reset counter to on delay blocks 722 and 730 refer to the delays provided by the back pressure off delay potentiometer 60 and the back pressure on delay potentiometer 58. However, a minimum on delay of a half a second is provided in the software of the microcontroller 24. Therefore, even if the on delay potentiometer is set to zero seconds, an automatic starting delay for the bowl feeder results due to the preprogrammed on delay value in the microcontroller. As will be explained, this feature allows for the system to be started sequentially.

The program then forwards to block 634 which indicates that it is now ready to set up the parameters necessary to drive the hopper 4. The program forwards to block 636 which calls again subroutine 700. However, this time, the focus is upon the hopper. Specifically, the on/off control signal read by block 704 for the hopper is the flow switch signal 62. The read invert switch block 706 for the hopper is the flow switch dip switch 38. The invert block 708 makes the determination as to whether it is necessary to invert the signal state required to activate the hopper. Further, the power on decision blocks 714, 720, and 726 refer to the power of the hopper. Moreover, the reset counter to off delay blocks 718 and 734 as well as the reset counter to on delay blocks 722 and 730 refer to the delays which are preferably preprogrammed into the microcontroller 24. Preferably, the on delay for the hopper 4 is 0.5 seconds and the off delay for the hopper is zero seconds. After block 636 completes the subroutine 700, it forwards once again to the calculate frequency block 606 where the sequence described may be repeated. Although the linear feeder and hopper feeder on and off delay times may be preprogrammed into the microcontroller, they may also be provided directly by the user as was done by potentiometers 58 and 60 for setting the on and off delays of the bowl feeder 6.

The time delays preprogrammed into the microcontroller 24 for turning on the linear feeder 8, bowl feeder 6, and hopper 4 allow the system to be started in a sequential manner. That is, the linear feeder 8 is started before the bowl feeder 6 by an amount of time equal to the potentiometer setting of potentiometer 58 as well as the preprogrammed time provided in the microcontroller 24 for turning on the bowl feeder (i.e., the preprogrammed on delay for the bowl feeder). In addition, the bowl feeder 6 is started before the hopper 4 by an amount of time equal to the preprogrammed time provided in the microcontroller 24 for turning on the hopper 4 (i.e., the on delay for the hopper). Sequential starting is desirable because parts down the line are fed prior to addition of part up the line and thus helps prevent the unwanted backlogging of parts along the feeding system.

When the back pressure sensor 18 senses a backlogging of parts, the master controller 20 informs the bowl feeder 6 to stop. The delay in stopping the bowl feeder 6 depends upon the amount of time equal to the potentiometer setting of potentiometer 60 as well as the preprogrammed time in the microcontroller 24. The hopper 4 is turned off after the amount of time preprogrammed into the microcontroller 24 for doing the same (i.e., zero to 0.25 seconds). The linear feeder 8 continues feeder the pans until the parts are no longer backlogged. When the back pressure sensor 18 senses that the linear feeder 8 is no longer backlogged with parts, the bowl feeder 6 and hopper 4 are sequentially started as noted above.

The master controller 20 may be programmed to provide zero delays in turning off the hopper 4, bowl feeder 6, and linear feeder 8 when the master controller is turned off (i.e., the off delay preprogrammed into the computer is set to zero for each of the three components). This will allow all of the components to stop immediately once the on/off line switch 16 is activated.

Referring to FIG. 17, there is shown a flow chart of the zero cross interrupt subroutine 740. The zero cross interrupt is started each time the line voltage 17 goes from the negative to positive phase and crosses the zero point as indicated by block 742 (i.e., each time the zero cross signal square wave 22 begins as shown in FIG. 2). The current time provided by the micro processor clock, not shown, is referenced by the subroutine 740 as indicated by block 744. The time is stored by block 744 in order calculate the frequency of the line voltage 17 (i.e., 50 Hertz or 60 Hertz). The timer for counting the half phase of the line voltage 17 is started as indicated by block 746. When an AC rather than RC signal is selected (i.e., for the bowl feeder and linear feeder), it will be necessary to trigger the respective power semiconductor for the bowl feeder and linear feeder during both the positive portion and negative portion of a given cycle or phase of the line voltage 17. The timer for counting the half phase allows a triggering of the power semiconductor at the same time relative to the zero cross point for both the positive and negative portion of a given cycle of the line voltage 17.

After the timer for calculating the half phase has been started, a gate flag is set to yes as indicated by block 748. The phase angle timers are then started as indicated by block 750. Three separate phase angle timers, not shown, are used to time the phase shift relative to the zero cross point for activating the hopper 4, bowl feeder 6, and linear feeder 8. As stated earlier, the setting of the hopper dial 10, bowl feeder dial 12, and linear feeder dial 14 determine when a given power semiconductor 28, 30 and 32 is activated relative to the zero cross point. The phase angle timers counts the time for when the respective power semiconductor should be turned on (i.e., the portion of the cycle for each phase of the line voltage 17) and thus each phase angle timer is dependent upon the setting of each of the dials 10, 12, and 14. The appropriate phase shift (i.e., delay from when the appropriate power semiconductor is activated relative to the zero cross point) is calculated in the calculate phase shift block 624 of the main program loop 600. Once the appropriate phase angle timer reaches the required count, it activates the phase angle interrupt subroutine 788 for each of the hopper, bowl feeder, and linear feeder to be described.

The zero cross interrupt subroutine 740 is temporarily disabled in order to prevent a noise spike from accidentally triggering the zero cross interrupt subroutine as noted by block 752. Preferably, the subroutine is temporarily disabled for a period of time until just before the line voltage 17 goes from the negative phase to the positive phase (i.e., just before reaching the zero cross point from the negative phase). Subsequently, a half toggle flag is set to yes as indicated by block 754. This half toggle flag indicates to the half wave interrupt subroutine 760 to be described that the appropriate power semiconductors may be activated during the negative phase of the line voltage 17.

A counter, not shown, may also be decremented each time the zero cross interrupt subroutine is activated as indicated by block 756. This counter may be used to time, for example, the on and off delay time for the bowl feeder. Subsequently, the zero cross interrupt subroutine returns to where the program was prior to calling the interrupt subroutine as indicated by block 758.

Referring to FIG. 18, there is shown a half wave interrupt subroutine 760. The half wave interrupt subroutine 760 is started each time the zero cross point is reached as indicated by block 762. The subroutine then proceeds to decision block 764. If the half toggle flag is set to yes by block 754 of the zero cross interrupt subroutine 740 (i.e., the zero cross interrupt subroutine 740 has just previously been activated in order to provide the appropriate activation signals to the power semiconductors during the positive phase of the line voltage 17), then the program proceeds to block 766 where the half toggle flag is set to no. Therefore, the next time the half wave interrupt subroutine 760 is activated, decision block 764 will proceed to block 768 which activates the zero cross interrupt subroutine 740. The subroutine 760 will then returns to where the program was prior to calling the subroutine as indicated by block 770.

Once block 766 sets the half toggle back to no, the program proceeds to block 772 which sets a half wave timer, not shown, to enable the activation of the zero cross interrupt subroutine 740. That is, the half wave timer counts half the phase of the line voltage 17 in order to activate the zero cross interrupt subroutine 740 then next time the zero cross point is reached.

The half wave interrupt subroutine 760 then proceeds to decision block 774. If the bowl feeder 6 is set to the RC setting (i.e., the bowl feeder is only activated during the positive portion of the line voltage 17), then the subroutine proceeds directly to decision block 776. If the bowl feeder 6 is set to the AC setting, then the subroutine proceeds to block 778 where a bowl gate flag is set to yes and the bowl phase angle timer is started as noted by block 780. Once the timer has counted the appropriate amount of time, the phase angle interrupt subroutine 788 to be described for activating the bowl feeder is started.

The subroutine then forwards to decision block 776. If the linear feeder 8 is set to the RC setting (i.e., the linear feeder is only activated during the positive portion of the line voltage 17), then the subroutine returns to where the program was prior to calling the subroutine as indicated by block 776. If the linear feeder 8 is set to the AC setting, then subroutine proceeds to block 784 where a linear gate flag is set to yes and the linear phase angle timer is started as noted by block 786. Once the timer has counted the appropriate amount of time, the phase angle interrupt subroutine 788 to be described for activating the linear feeder is started. The subroutine then returns to where the program was prior to calling the subroutine as indicated by block 776.

Put simply, the half wave interrupt subroutine 760 activates the appropriate power semiconductors for powering the linear feeder and bowl feeder during the negative portion of the line voltage 17 and the zero cross interrupt subroutine 760 activates the appropriate power semiconductors for powering the linear feeder, bowl feeder and hopper during the positive portion of the line voltage 17. It should also be mentioned that hoppers are typically RC operating systems and thus the power semiconductor 28 for activating the hopper would only be triggered during the positive portion of the line voltage 17. However, an AC operating hopper could be triggered during the positive an negative portion of the line voltage 17 as was described in relation to the bowl feeder and linear feeder.

Referring to FIG. 19, there is shown a flow chart for the phase angle interrupt subroutine 788 used in connection with activating the hopper, bowl feeder, and linear feeder. Although one phase angle interrupt subroutine 788 is shown, a separate phase angle subroutine 788 is provided for each of the hopper, bowl feeder and linear feeder. As stated earlier in relation to FIGS. 17 and 18, the phase angle interrupt subroutine 788 for each of the hopper, bowl feeder, and linear feeder is activated once the appropriate timers which were started by the start phase angle timer block 750 of the zero cross interrupt subroutine 740 or the start bowl phase angle timer block 780 and the start linear phase angle timer block 786 of the halfwave interrupt subroutine 760 have counted the appropriate amount of time.

Once the phase angle interrupt subroutine 788 is activated as noted by block 790, the subroutine proceeds to decision block 792. For purposes of illustration, the phase angle interrupt subroutine 790 will be described in relation to activating the bowl feeder 6, although as noted before, a similar subroutine is provided for activating the hopper 4 and linear feeder 8. If the gate flag for the bowl feeder 6 has been turned on (i.e., by block 778 of the half wave interrupt subroutine 760), then the subroutine forwards to block 794 which turns the gate on for the appropriate power semiconductor—in this case, the bowl feeder power semiconductor 30. The program then sets the bowl gate flag to no as noted by block 796. The subroutine then sets the phase angle timer for the gate pulse width as noted by block 798. The gate pulse width for activating the bowl feeder power semiconductor 30 (as well as the gate pulse width for activating the hopper power semiconductor 28 and linear feeder semiconductor 32) may be programmed into microcontroller 24. The pulse is of such a width as to ensure that the power semiconductor remains on once it is applied. The program then returns to where the program was prior to calling the subroutine as noted by block 800. If the gate flag is not on, then the subroutine forwards to the turn gate off block 802 and then returns to where the program was prior to calling the subroutine. The gate flag will be set to no.

In short, the phase angle interrupt subroutine 788 times the phase angle delay and the pulse width for turning on the gate of the respective power semiconductor 28, 30, and 32. Further, the phase angle interrupt subroutine 788 turns off the gate of the respective power semiconductor 28, 30, and 32 at the appropriate time.

Various modifications to the equipment and to the techniques described herein should be apparent from the above description of the preferred embodiments. Although the invention has thus been described in detail for these embodiments, it should be understood that this explanation is for illustration, and that the invention is not limited to these embodiments. Alternative equipment and operating techniques will thus be apparent to those skilled in the art in view of this disclosure. Modifications are thus contemplated and may be made without departing form the spirit of the invention, which is defined by the claims.

What is claimed is:

1. A blown fuse indicator circuit comprising:

a first diode and a first resister comprising a first series;

a second diode and a second resistor comprising a second series;

a fuse disposed between one end of said first series and one end of said second series;

a zener diode and a light emitting diode comprising a third series, said third series connected to an opposing end of said first series; and an opto-coupler circuit disposed between one end of said third series, an opposing end of said second series and an opposing end of said third series.

2. The invention of claim 1 wherein said blown fuse circuitry detects whether a fuse for one of a hopper, bowl feeder, linear feeder, back pressure sensor, and main line has blown.

3. A controller for controlling a part feeder system comprising:

a microcontroller;

a first semiconductor for providing activating power to a bowl feeder; and blown fuse circuitry, said blown fuse circuitry comprising a first diode and a first resister comprising a first series, a second diode and a second resistor comprising a second series, a fuse disposed between one end of said first series and one end of said second series, a zener diode and a light emitting diode comprising a third series, said third series connected to an opposing end of said first series, and an opto-coupler circuit disposed between one end of said third series, an opposing end of said second series and an opposing end of said third series, said blown fuse circuitry preventing voltage from passing to a load when said fuse associated with said load has blown;

wherein said microcontroller calculates a phase delay relative to a reference signal for activating said first semiconductor.

4. The invention of claim 3 wherein said blown fuse circuitry detects whether a fuse for one of a hopper, bowl feeder, linear feeder, back pressure sensor, and main line has blown.

* * * * *